(12) United States Patent
Nishimura

(10) Patent No.: US 9,722,941 B2
(45) Date of Patent: Aug. 1, 2017

(54) COMMUNICATION DEVICE AND COMMUNICATION METHOD

(71) Applicant: FUJITSU LIMITED, Kawasaki-shi, Kanagawa (JP)

(72) Inventor: Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 14/515,589

(22) Filed: Oct. 16, 2014

(65) Prior Publication Data

US 2015/0124836 A1    May 7, 2015

(30) Foreign Application Priority Data

Nov. 5, 2013   (JP) .................. 2013-229788

(51) Int. Cl.
*H04L 12/863* (2013.01)
*H04L 12/875* (2013.01)
*H04L 12/935* (2013.01)

(52) U.S. Cl.
CPC .......... *H04L 47/621* (2013.01); *H04L 47/562* (2013.01); *H04L 49/3027* (2013.01)

(58) Field of Classification Search
CPC .......................... H04L 47/621; H04L 47/562
See application file for complete search history.

(56) References Cited

U.S. PATENT DOCUMENTS

2003/0128712 A1   7/2003  Moriwaki et al.
2007/0058600 A1   3/2007  Chung et al.

FOREIGN PATENT DOCUMENTS

JP    2003-204347    7/2003
JP    2007-82210     3/2007

*Primary Examiner* — Derrick Ferris
*Assistant Examiner* — Kevin Lee
(74) *Attorney, Agent, or Firm* — Staas & Halsey LLP

(57) ABSTRACT

A communication device includes: a plurality of output ports; a plurality of queues in which packets are stored so as to be sorted into groups of packets that are output from an identical output port in an identical time period, from among the plurality of output ports; a plurality of first selectors that respectively corresponds to the plurality of output ports, and each of which switches a queue from which packets that are output from the output port are read, between the plurality of queues each time the time period elapses; and a second selector that switches a first selector from which packets are output, between the plurality of first selectors, at time intervals in accordance with output rates of packets of the plurality of output ports.

8 Claims, 15 Drawing Sheets

COMMUNICATION DEVICE AND COMMUNICATION METHOD

CROSS-REFERENCE TO RELATED APPLICATION

This application is based upon and claims the benefit of priority from the prior Japanese Patent Application No. 2013-229788 filed on Nov. 5, 2013, the entire contents of which are incorporated herein by reference.

FIELD

The embodiments discussed herein are related to a communication device and a communication method.

BACKGROUND

With an increase in communication demand, it is desirable that the throughput of switching devices such as a layer 2 switch and a router, that is, a packet switching device that exchanges packets is increased. In order to improve the throughput, it has been proposed to improve a scheduler that manages traffic by the control of reading packets from a plurality of queues (for example, Japanese Laid-open Patent Publication No. 2003-204347).

SUMMARY

According to an aspect of the invention, a communication device includes: a plurality of output ports; a plurality of queues in which packets are stored so as to be sorted into groups of packets that are output from an identical output port in an identical time period, from among the plurality of output ports; a plurality of first selectors that respectively corresponds to the plurality of output ports, and each of which switches a queue from which packets that are output from the output port are read, between the plurality of queues each time the time period elapses; and a second selector that switches a first selector from which packets are output, between the plurality of first selectors, at time intervals in accordance with output rates of packets of the plurality of output ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
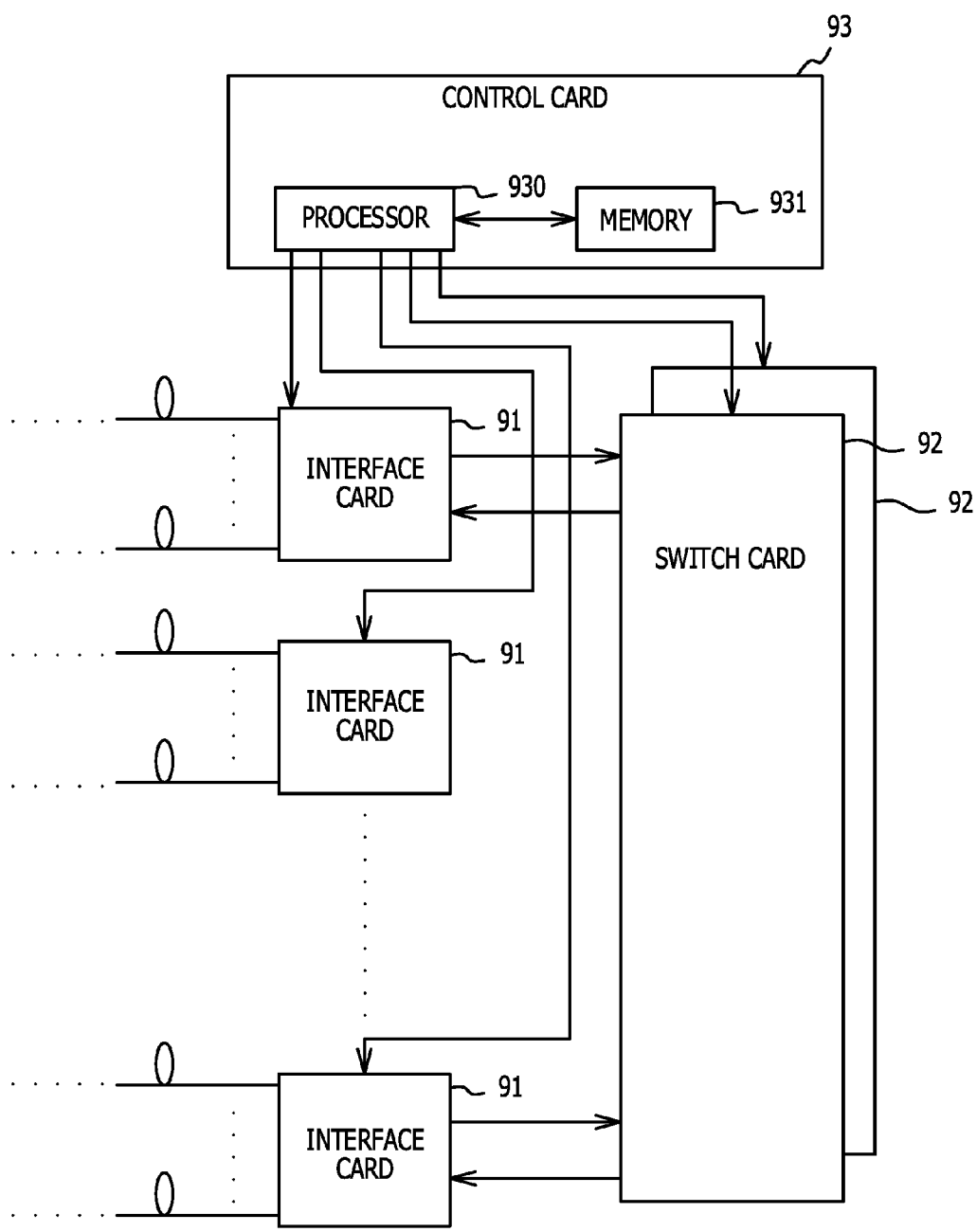
FIG. 1 is configuration diagram illustrating a function configuration of a communication device according to an embodiment.

As the type of the scheduler, for example, there are "an output-type scheduler" and "an input-type scheduler". The output-type scheduler is provided on the output side of queues that store packets, and selects a queue from which a packet is read. When the output-type scheduler is used, the capacity of a queue for each flow (packet category in accordance with a destination, a priority level, or the like) is easily set and quality of service (QoS) is easily achieved. However, in the output-type scheduler, as the number of queues becomes large, contention of read processing between queues easily occurs, so that it takes a long time to select a read target queue, thereby affecting the throughput.

In contrast, the input-type scheduler is provided on the input side of queues, determines a time at which a packet is output, and sequentially inputs a packet to a plurality of queues for corresponding time periods in which a packet is output (for example, time period by the unit of second), in accordance with the determined time. Here, an amount of packets that are stored in each of the queues is limited to an amount of packets that are allowed to be read within the time period. That is, packets in each of the queues are read before a time period of a queue from which packets are to be read next starts. As a result, in the input-type scheduler, contention of read processing between queues is avoided, and the high throughput is achieved.

The input-type scheduler inputs a packet to each of the queues in accordance with the rate of a flow of the packet (packet category in accordance with a destination, a priority level, or the like). For example, in a case in which a time period of each queue is determined by the unit of second, the input-type scheduler inputs one packet to each of the queues when the rate is 1 (packet/sec), and inputs three packets to each of the queues when the rate is 3 (packets/sec). In addition, the input-type scheduler inputs one packet to every other queue when the rate is 0.5 (packets/sec).

The packets that are read from the queues are transmitted to another device through an output port that corresponds to the destination among a plurality of output ports. The output port receives a pause frame from the other device for example when an accumulation amount of packets in a reception buffer exceeds a certain threshold value in the other device.

For example, in the Ethernet (registered trademark, hereinafter similarly), an output port among a plurality of output ports that receives a pause frame performs pause control on queues in order to terminate read processing of packets. However, the queues store packets that are output from not a certain output port, but the plurality of output ports, so that the read processing of packets that are output from the other output ports are also terminated in addition to the output port that receives the pause frame when the pause control is performed. The problem is called "Head of Line Blocking" or the like.

In order to avoid such a problem, a queue may be provided for each output port. That is, packets that are output from an output port may be input to a corresponding queue. However, in this case, the same number of queues as the number of output ports is provided for each time period, so that the number of queues is increased. Thus, the size of hardware that manages the queues is increased and the configuration of the hardware is complicated, and problems of an increase in the cost and a reduction in the throughput are caused.

In contrast, when the capacities of queues are increased by bundling the queues of a plurality of time periods for each output buffer, an increase in the number of queues may be avoided. For example, in a case in which the time period of the queue is determined by the unit of second, when 10 queues are bundled for a common output port, a time period of each queue may be determined to a unit of 10 seconds.

However, in this case, the time period of the single queue is increased, the number of packets that are sequentially output from the same output port in the time period is increase, so that the burstiness is increased. As a result, there occurs a problem that the read standby time is increased when pause control frequently occurs or a packet loss occurs because the read rate of packets exceeds the output rate in the output port, so that the communication quality is reduced.

Therefore, embodiments discussed herein are made in view of the above-described problems, and an object of the embodiments is, for example, to provide a communication device and a communication method by which the communication quality is improved.

FIG. 1 is a configuration diagram illustrating a function configuration of a communication device according to an embodiment. The communication device includes a plurality of network interface cards 91, two switch cards 92, and a control card 93. The cards 91 to 93 each of which is accommodated in an individual slot that is provided in a housing are electrically connected to each other. In the embodiments, a packet switching device such as a layer 2 switch or a router is used as an example of the communication device, but the embodiment is not limited to such an example.

The communication device relays a packet that has been received from an external device to further another external device, in accordance with the destination. In the embodiment, the packet corresponds to a unit of transmission of data (information) to be transmitted, and an Ethernet frame is described herein as an example of the packet, but the embodiment is not limited to such an example, and a frame of another standard such as an IP packet may be employed.

Each of the plurality of network interface cards 91 transmits and receives packets to and from an external device. As the external device, for example, there are a terminal device such as a personal computer, a server device, and a router. The plurality of network interface cards 91 is connected to optical fibers through a plurality of ports, and performs communication, for example, based on standard of 10 GBASE-LR.

Each of the two switch cards 92 exchanges packets with the plurality of network interface cards 91. For example, to the switch card 92, a packet is input from the network interface card 91, and the switch card 92 outputs a packet to the network interface card 91 that corresponds to the destination. The two switch cards 92 are respectively used as an active system and a standby system, for example, in preparation for disorder such as hardware failure.

The control card 93 controls the plurality of network interface cards 91 and the two switch cards 92. The control card 93 is connected to a network control device and the like, and executes processing that is related to a user interface, setting processing for each of the cards 91 and 92, data collection processing from each of the cards 91 and 92, and the like. The control card 93 includes a processor 930 such as a central processing unit (CPU) that executes the pieces of processing, and a memory 931 that stores a program that causes the processor 930 to be driven.

Figure 2:
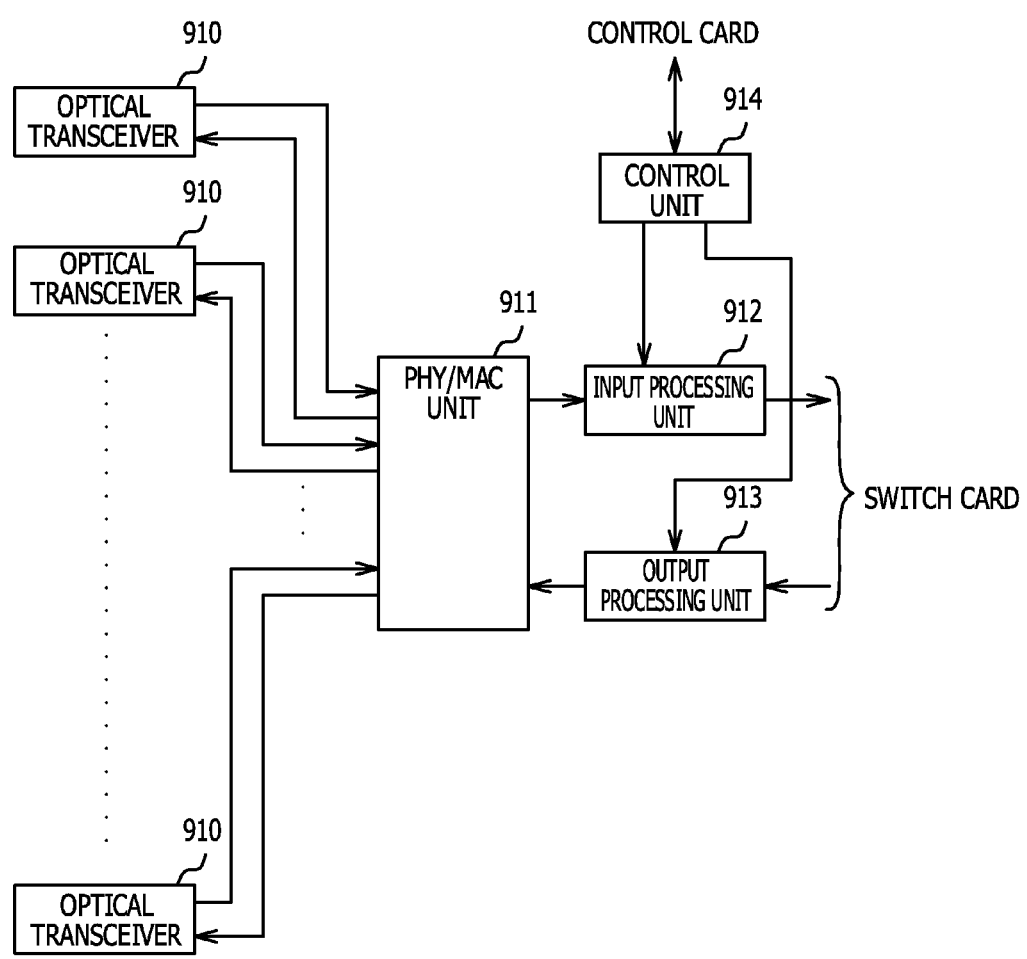
FIG. 2 is a configuration diagram illustrating a function configuration of a network interface card.

FIG. 2 is a configuration diagram illustrating a function configuration of the network interface card 91. The network interface card 91 includes a plurality of optical transceivers 910, a PHY/MAC unit 911, an input processing unit 912, an output processing unit 913, and a control unit 914.

Each of the plurality of optical transceivers 910 converts an optical signal that has been received from an external device through optical fibers into an electrical signal and outputs the converted signal to the PHY/MAC unit 911, and converts an electrical signal that has been input from the PHY/MAC unit 911 into an optical signal and outputs the converted signal to the external device through the optical fibers. That is, each of the plurality of optical transceivers 910 functions as a port that is used to transmit and receive packets to and from the external device.

The PHY/MAC unit 911 executes establishment processing of link with the external device and distribution processing of packets to the plurality of optical transceivers 10. The PHY/MAC unit 911 outputs packets that have been input from the plurality of optical transceivers 910, to the input processing unit 912, and outputs packets that have been input from the output processing unit 913, to the plurality of optical transceivers 910.

The input processing unit 912 and the output processing unit 913 respectively execute packet processing of INGRESS and EGRESS. The input processing unit 912 executes bandwidth control processing and the like of packets, and outputs the packets to the switch card 92. The output processing unit 913 executes bandwidth control processing and the like of packets that have been input from the switch card 92, and outputs the packets to the PHY/MAC unit 911.

The control unit 914 communicates with the control card 93, and controls the input processing unit 912 and the output processing unit 913. The control unit 914 includes a processor such as a CPU and a memory (not illustrated).

Figure 3:
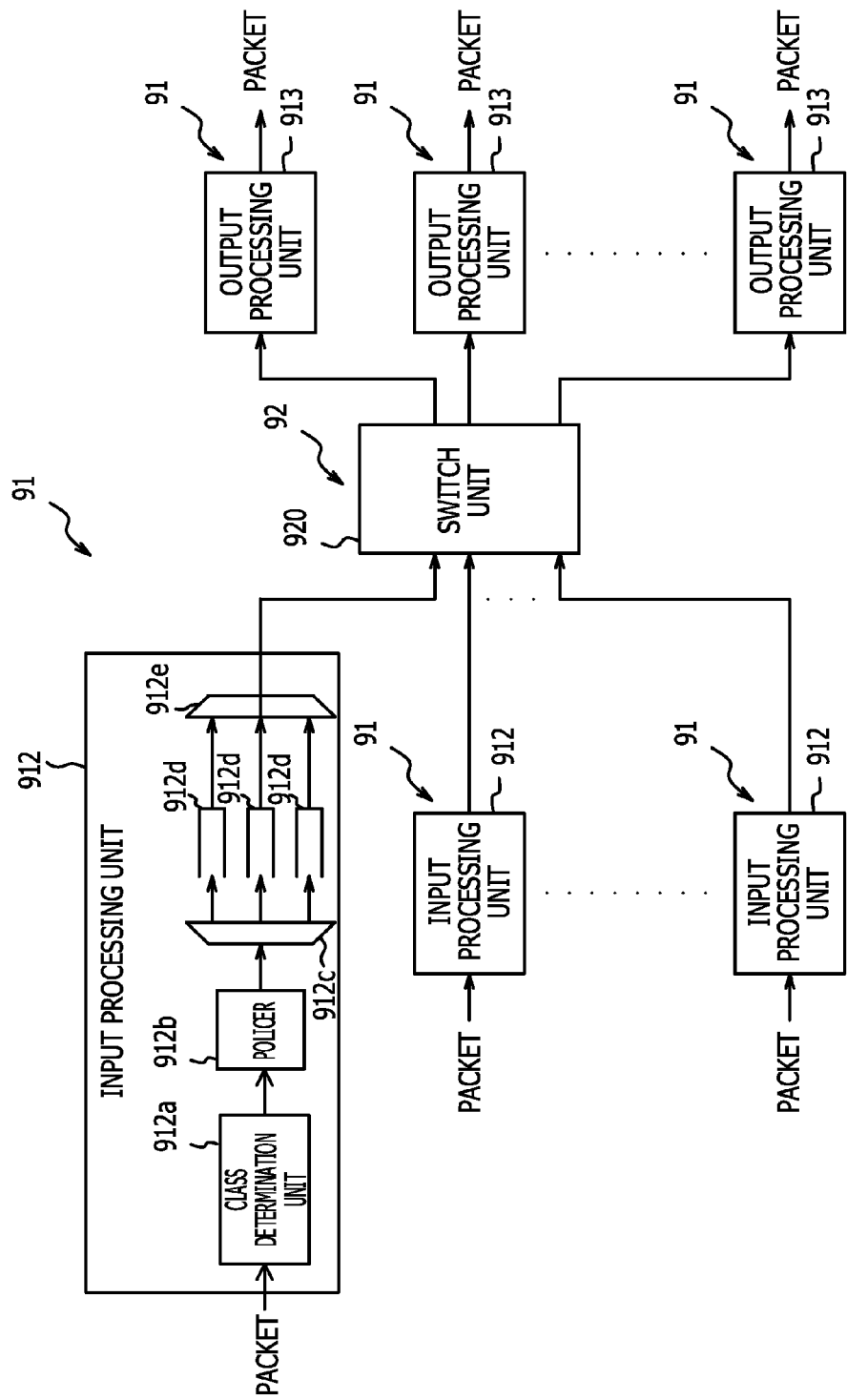
FIG. 3 is a diagram illustrating paths of packets in the communication device.

In FIG. 3, paths of packets in the communication device are illustrated. Also FIG. 3 illustrates a configuration of the input processing unit 912.

First, a packet is input to the input processing unit 912 of the network interface card 91. The input processing unit 912 includes a class determination unit 912*a*, a policer 912*b*, a distribution unit 912*c*, a plurality of input queues 912*d*, and an output unit 912*e*.

The class determination unit 912*a* determines a class of an communication quality (QoS) for each packet, and assigns a flow ID that corresponds to the class, to the packet, for example, so as to be included in the header in the device. The class determination unit 912*a* determines a class, for example, based on a destination address (DA) or a virtual local area network (VLAN) ID that is included in the header of the packet.

The policer 912*b* discards packets that are an excess portion for a certain bandwidth so that a traffic amount of input packets does not exceed the certain bandwidth. The distribution unit 912*c* distributes packets to the plurality of input queues 912*d* in accordance with a network interface card 91 that is the destination. That is, the input queue 912*d* is provided for each of the network interface cards 91. Each of the plurality of input queues 912*d* accumulates packets until the packets are read by the output unit 912*e*. The output unit 912*e* selects one of the plurality of input queues 912*d*, reads packets from the selected input queue 912*d*, and outputs the packets to a switch unit 920 of the switch card 92. The switch unit 920 outputs the input packets to the output processing unit 913 of the network interface card 91 that corresponds to the destination.

First Comparative Example

An input-type scheduler according to a first comparative example is described below. The input-type scheduler is provided in an output processing unit 913, and distributes packets to a plurality of queues at a rate that corresponds to the flow ID. In the example, the case is described in which the packet length (data amount) is fixed, but the embodiment is not limited to such an example, and the contents that are described below may be also applied to a variable-length packet.

Figure 4:
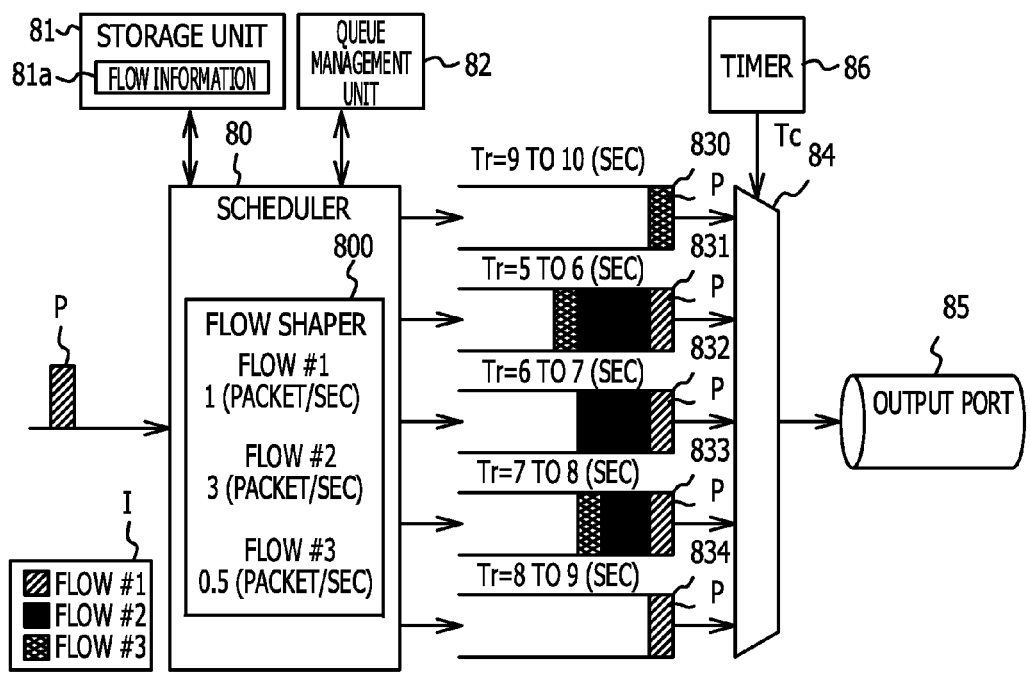
FIG. 4 is a configuration diagram of a function configuration of an output processing unit according to a first comparative example.

FIG. 4 is a configuration diagram illustrating a function configuration of an output processing unit 913 according to the first comparative example. The output processing unit 913 includes a scheduler 80, a storage unit 81, a queue management unit 82, a plurality of queues (time buffers) 830 to 834, and a selector 84. An output port 85 corresponds to, for example, the optical transceiver 910 that transmits a packet P to another device.

The scheduler 80 includes a flow shaper 800, and distributes packets P that have been input from the switch unit 920, to the plurality of queues 830 to 834 based on the rate for each flow ID. In the example, a rate of a flow #1 (the number of packets per one second) is set at 1 (packet/sec), and a rate of a flow #2 is set at 3 (packets/sec), and a rate of a flow #3 is set at 0.5 (packets/sec). In FIG. 4, packets P of the flow IDs #1 to #3 are distinguished as illustrated by the symbol I.

Each of the queues 830 to 834 is a buffer such as first in first out (FIFO), and stores a packet P that is input from the scheduler 80. To each of the queues 830 to 834, a time period Tr in which a packet P is output, is assigned by the selector 84.

The selector 84 switches the queue from which a packet P is output, between the queues 830 to 834 each time the time period Tr (unit of second) elapses. For example, the selector 84 selects a queue of a time period Tr that corresponds to a time Tc that is indicated by a timer 86, from the plurality of queues 830 to 834, reads a packet P from the queue, and outputs the read packet P to the output port 85. The packet P is output from the output port 85 to another device.

For example, the queue 831 corresponds to the time period Tr of "5 to 6 (sec)", so that the queue 831 is selected by the selector 84, and the stored packet P is output from the output port 85 when the time Tc corresponds to "5 to 6 (sec)". In addition, the queue 832 corresponds to the time period Tr of "6 to 7 (sec)", so that the queue 832 is selected by the selector 84, and the stored packet P is output from the output port 85 when the time Tc corresponds to "6 to 7 (sec)".

As described above, the packet that is stored in each of the queues 830 to 834 is read within a certain time period Tr. That is, the packet that is stored in each of the queues 830 to 834 is read before a time period Tr of the next queue starts. Thus, the capacity of each of the queues 830 to 834 is limited to an amount of packets that are allowed to be read within a certain time (one second) that is the length of each of the time periods Tr. For example, when nine packets P are read from the queues 830 to 834 at maximum per one second, and output from the output port 85, the capacity of each of the queues 830 to 834 is limited to nine packets. Hereinafter, the length of the time periods Tr is referred to as "time width".

In addition, to the queues 830 to 834 that become empty, new time periods Tr are assigned. For example, when the queue 831 becomes empty, a new time period Tr of "10 to 11 (sec)" is assigned to the queue 831. Therefore, the selector 84 repeatedly selects the queue from the queues 830 to 834 in accordance with the times Tc. Thus, from among the queues 830 to 834 that stores packets P, even a queue that corresponds to a time period Tr that is ahead of the current time period by a certain time portion is allocated all the times, regardless of the time Tc.

The selector 84 keeps the selection of one of the queues 830 to 834 until the time period Tr ends even when the queue become empty in the middle of the time period Tr. For example, even when the queue 831 becomes empty at the time Tc of "5.5 (sec)", the selector 84 keeps to select the same queue 831 until the time Tc of "6 (sec)" arrives.

The flow shaper 800 determines a time at which a packet P is output so that the rate for each of the flow IDs is maintained, and inputs the packet P to one of the queues 830 to 834 of the time period Tr that corresponds to the determined time. For example, the rate of the flow #1 is 1 (packet/sec), so that the flow shaper 800 inputs one packet of the flow #1 to each of the queues 830 to 834. Here, the time width of each of the queues 830 to 834 is one second, so that one packet P is output per one second, and the rate of the flow #1 is maintained.

The rate of the flow #2 is 3 (packets/sec), so that the flow shaper 800 inputs three packets P of the flow #2 to each of the queues 830 to 834. Therefore, the three packets P are output per one second, and the rate of the flow #2 is maintained.

The rate of the flow #3 is 0.5 (packets/sec), the flow shaper 800 inputs one packet of the flow #3 to every other queue from 830 to 834. Therefore, one packet P is output per two seconds, and the rate of the flow #3 is maintained.

As described above, the scheduler 80 distributes packets P to the plurality of queues 830 to 834 at the upstream of the queues 830 to 834, in accordance with the rate for each of the flow IDs. Therefore, the scheduler 80 avoids contention of read processing between the queues 830 to 834 and achieves the high throughput as compared with the output-type scheduler.

In the example, the case is described in which the length of a packet is fixed, but in the case of the variable-length packet, the capacity of each of the queues 830 to 834 is managed in a unit of byte. In this case, the scheduler 80 distributes packets P to the queues 830 to 834 with reference to flow information 81a that is stored in the storage unit 81 such as a memory and management information that is stored in the queue management unit 82.

The flow information 81a indicates for example, the capacity (byte) of each of the queues 830 to 834, one of the queues 830 to 834, to which a packet P is input next, and the free space (byte) of the next one of the queues 830 to 834 so as to improve the shaping granularity and be compatible with the variable-length packet. The queue management unit 82 manages the free states of the queues 830 to 834 as management information.

The scheduler 80 obtains information on the flow ID, the packet length, and the like from the arrived packet P, and determines one of the queues 830 to 834, to which the packet P is input, based on the flow information 81a and the management information. The scheduler 80 updates the flow information 81a and the management information when the packet P is input to the determined one of the queues 830 to 834.

In addition, an accumulation amount of the packets P in the queues 830 to 834 is managed using an upper limit value (byte). The scheduler 80 terminates input of the packets P to the queues when a total of the data amounts (bytes) of the packets P that are stored in the queues 830 to 834 exceeds the upper limit value. A total amount of the packets P that are output for each of the time periods Tr is levelled by flexible adjustment of the upper limit value and the read time of each of the queues 830 to 834.

Second Comparative Example

In the first comparative example, packets P are output from the single output port 85, but may be output from a plurality of output ports. In this case, the packets P are output from an output port that corresponds to the destination, from among the plurality of output ports.

Figure 5:
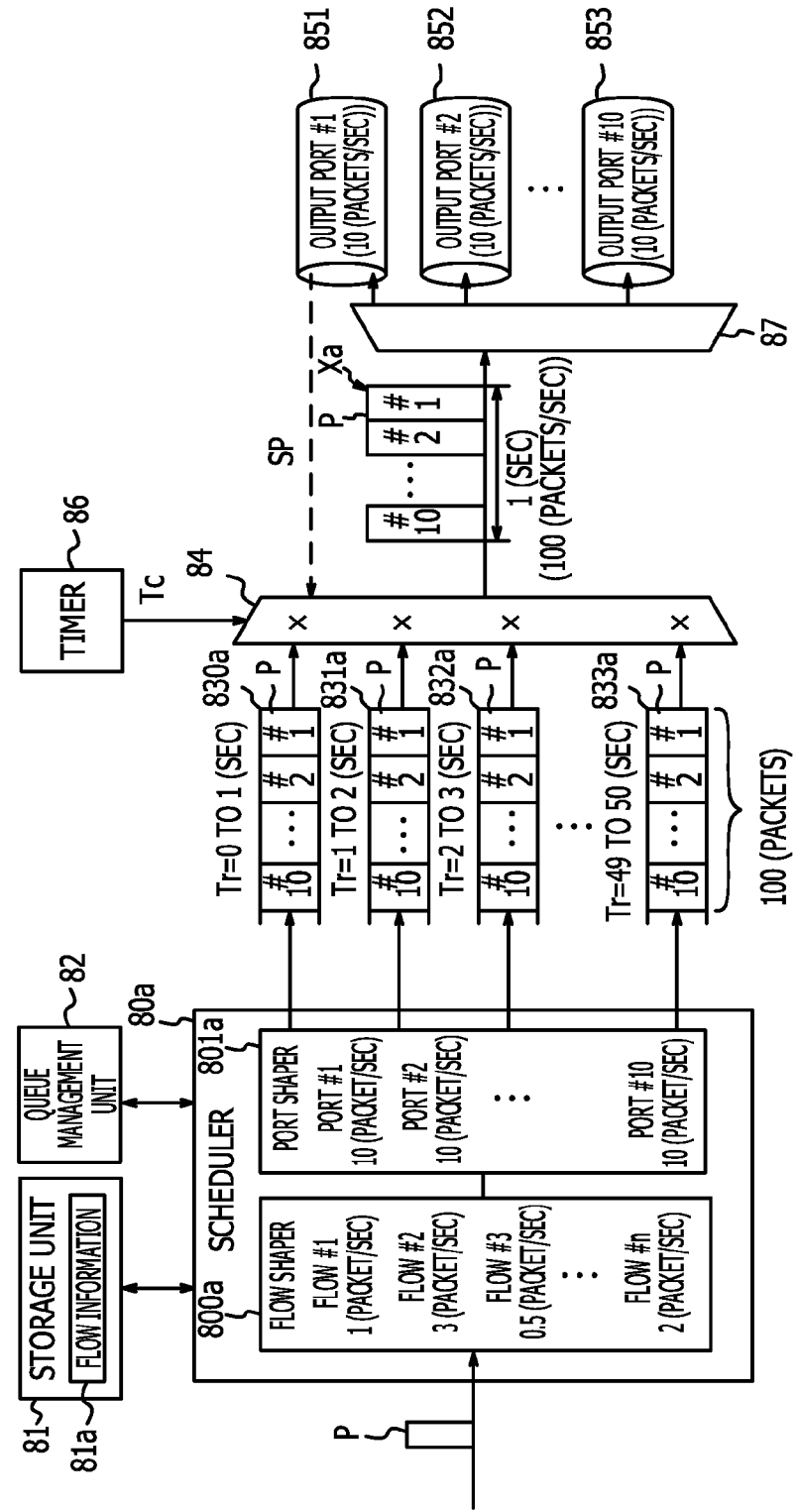
FIG. 5 is a configuration diagram illustrating a function configuration of an output processing unit according to a second comparative example.

FIG. 5 is a configuration diagram illustrating a function configuration of an output processing unit 913 according to a second comparative example. In FIG. 5, the same symbol is assigned for a configuration that is common with that of FIG. 4, and the description is omitted herein.

The output processing unit 913 includes a scheduler 80a, the storage unit 81, the queue management unit 82, a plurality of queues 830a to 833a, and the selector 84. In this example, packets P are output from the 10 output ports 851 to 853 that correspond to the optical transceiver 910. In addition, a distribution unit 87 corresponds to the PHY/MAC unit 911, and distributes the packets P that are read from the queues 830a to 833a to the output ports 851 to 853.

In addition, in FIG. 5, the symbol P indicates 10 packets. The numbers in packets P ("#1" to "#10") respectively indicate the output ports 851 to 853 from which the packets P are output. For example, the packet P having the number "#1" is output from the output port (#1) 851.

The scheduler 80a includes a flow shaper 800a and a port shaper 801a. The flow shaper 800a distributes packets P to the plurality of queues 830a to 833a in accordance with the rate for each flow ID, similar with the first comparative example.

The port shaper 801a distributes packets P to the plurality of queues 830 to 834 in accordance with the output rate of the output ports 851 to 853. The port shaper 801a distributes 10 pieces of packet P that are to be output from each of the output ports 851 to 853, to each of the queues 830a to 833a when the output rate of each of the output ports 851 to 853 is, for example, 10 (packets/sec).

Similar to the first comparative example, in each of the queues 830a to 833a, the packets P are read within the assigned time period Tr. In the example, the 50 queues 830a to 833a are provided that respectively correspond to the time periods Tr of "0 to 1 (sec)", "1 to 2 (sec)", . . . , and "49 to 50 (sec)". For example, packets P that are stored in the queue 830a that corresponds to the time period Tr of "0 to 1 (sec)" are read at the time Tc of "0 to 1 (sec)" by the selector 84. In addition, packets P that are stored in the queue 831a that corresponds to the time period Tr of "1 to 2 (sec)" are read at the time Tc of "1 to 2 (sec)" by the selector 84.

In the example, packets P are output so as to be distributed to the 10 output ports 851 to 853 having the output rate of 10 (packets/sec). Therefore, the selector 84 has a read rate of 100 (packets/sec) (number of output ports 10×10 (packets/sec)).

In addition, the capacity of each of the queues 830a to 833a corresponds to 100 packets based on the read rate of the selector 84 because the time width of each of the queues is one second. That is, each of the queues 830a to 833a stores an amount of packets P that are allowed to be read within each of the time periods Tr, so that 100 packets P are stored at maximum based on the read rate of the selector 84.

In each of the queues 830a to 833a, 10 pieces (#1 to #10) of packet P that are to be output from each of the output ports (#1 to #10) 851 to 853 are stored at maximum by the port shaper 801a. Therefore, when the packets P that are stored in each of the queues 830a to 833a reaches the maximum amount, in data Xa by the unit of second and is output from the selector 84, 10 pieces (#1 to #10) of packet P that are to be output from each of the output ports (#1 to #10) 851 to 853 are included.

Each of the output ports 851 to 853 performs read termination control of the packets P on the selector 84 in accordance with back pressure control of another device (not illustrated) that is a transmission destination. For example, in the case of the Ethernet, each of the output ports 851 to 853 performs pause control on the selector 84 when a pause frame is received from another device that is the transmission destination.

For example, the output port (#1) 851 outputs a termination instruction signal Sp that is used to instruct the termination of read processing of the packets P, to the selector 84 when the output port (#1) 851 receives the pause frame. Here, each of the queues 830a to 833a stores the packets (#2 to #10) P that are to be respectively output from the other output ports (#2 to #10) 852 to 853 in addition to the packet (#1) P that is to be output from the output port (#1) 851.

Therefore, the selector 84 terminates read processing from all of the queues 830a to 833a in order to terminate read processing of the packet (#1) P that is to be output from the output port (#1) 851 (see x mark). Thus, the other devices that are transmission destinations of the output ports 851 to 853 are not allowed to receive the packets P. Such a problem is called "Head of Line Blocking".

Third Comparative Example

In order to solve the above-described problem, each of the queues 830a to 833a according to the second comparative example may be sorted for the output ports 851 to 853. In such a configuration, read processing of queues that correspond to one of the output ports 851 to 853, which outputs a termination instruction signal Sp may be merely terminated.

Figure 6:
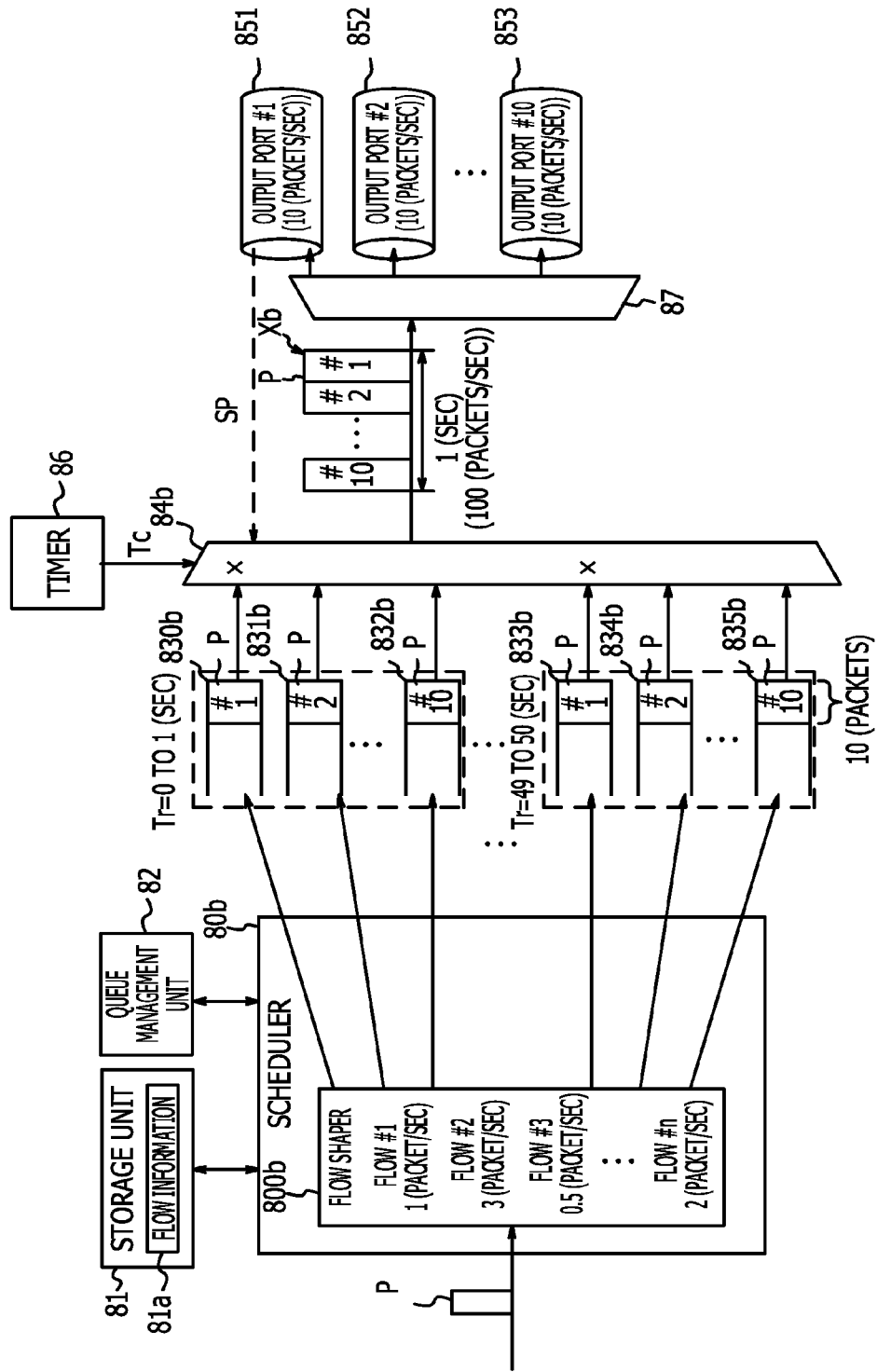
FIG. 6 is a configuration diagram illustrating a function configuration of an output processing unit according to a third comparative example.

FIG. 6 is a configuration diagram illustrating a function configuration of an output processing unit 913 according to a third comparative example. In FIG. 6, the same symbol is assigned for a configuration that is common with that of FIG. 5, and the description is omitted herein. In this example, the symbol P indicates 10 packets, and the numbers ("#1" to "#10") in the packets P respectively correspond to the output ports (#1 to #10) 851 to 853.

The output processing unit 913 includes a scheduler 80*b*, the storage unit 81, the queue management unit 82, a plurality of queues 830*b* to 835*b*, and a selector 84*b*. In this example, the plurality of queues 830*b* to 835*b* stores packets P so as to sort the packets P into groups of packets that are to be output from the same output port from among the output ports 851 to 853. That is, the plurality of queues 830*b* to 835*b* are provided so that the packets P of the time periods in the queues 830*b* to 835*b* respectively correspond to the plurality of output ports 851 to 853. The capacity of each of the queues 830*b* to 835*b* is a 10 packet portion.

Therefore, the packets P that are output in the same time period Tr are stored so as to be distributed to the 10 queues 830*b* to 832*b*, . . . , and the 10 queues 833*b* to 835*b*. For example, in the time period Tr of "0 to 1 (sec)", a packet P that is to be output from the output port (#1) 851 is stored in the queue 830*b*, and a packet P that is to be output from the output port (#2) 852 is stored in the queue 831*b*. In addition, in the time period Tr of "49 to 50 (sec)", a packet P that is to be output from output the port (#1) 851 is stored in the queue 833*b*, and a packet P that is to be output from the output port (#2) 852 is stored in the queue 834*b*.

Due to a queue configuration, the selector 84*b* reads the packets P from the 10 queues 830*b* to 832*b*, . . . , and the 10 queues 833*b* to 835*b* within each of the time periods Tr, that is, within one second that is the time width. That is, to be exact, the time width of each of the queues 830*b* to 835*b* is 0.1 second (time width 1 (sec)/10 (packets)). Thus, the selector 84*b* switches the queue from which the packet P is read, between the queues 830*b* to 835*b* for each 0.1 second.

Therefore, when the packets P that are stored in each of the queues 830*b* to 835*b* reaches the maximum amount, in data Xb in the unit of second, which is output from the selector 84, 10 pieces (#1 to #10) of packet P that are to be output from the output ports 851 to 853 are stored. That is, the 10 packets are input each of the output ports 851 to 853 per one second, so that the low burstiness that is similar to that of the second comparative example is achieved.

In addition, the queues 830*b* to 835*b* are sorted for the output ports 851 to 853, so that the scheduler 80*b* does not include a port shaper. The scheduler 80*b* includes the flow shaper 800*b* similar to that of the second comparative example.

For example, when a termination instruction signal Sp is input from the output port (#1) 851 to the selector 84*b*, the selector 84*b* merely terminates the read processing of the queues 830*b*, . . . , and 833*b* that correspond to the output port (#1) 851, from among the plurality of queues 830*b* to 835*b*. That is, the read processing of packets P from the queues 831*b* to 832*b*, . . . , and 834*b* to 835*b* that correspond to the other output ports (#2 to #10) 852 to 853 is not terminated, so that the above-described problem is solved.

However, in the example, the queues 830*b* to 835*b* are sorted for the output ports 851 to 853, the number of queues is larger than that of the second comparative example. That is, in the example, for each of the time periods Tr of "0 to 1 (sec)", "1 to 2 (sec)", . . . and, "49 to 50 (sec)", queues the number of which is same as that of the 10 output ports 851 to 853 are provided, so that the number of queues is 500 (the number of output ports 10×50). Thus, the scale of the hardware that manages queues is increased and the configuration of the hardware becomes complicated, and the problems of an increase in the cost and a reduction in the throughput occur.

Fourth Comparative Example

Therefore, the number of queues may be reduced by bundling the plurality of queues that has different time periods Tr and corresponds to the same output port from among the output ports 851 to 853, as one queue. In the example, the 10 queues of the time periods Tr (for example, "0 to 1 (sec)", "1 to 2 (sec)", . . . , and "9 to 10 (sec)") in 10 seconds in the third comparative example, which correspond to the same output port, are bundled as one queue. As a result, the number of queues becomes 50 (500/10) similar to the second comparative example.

Figure 7:
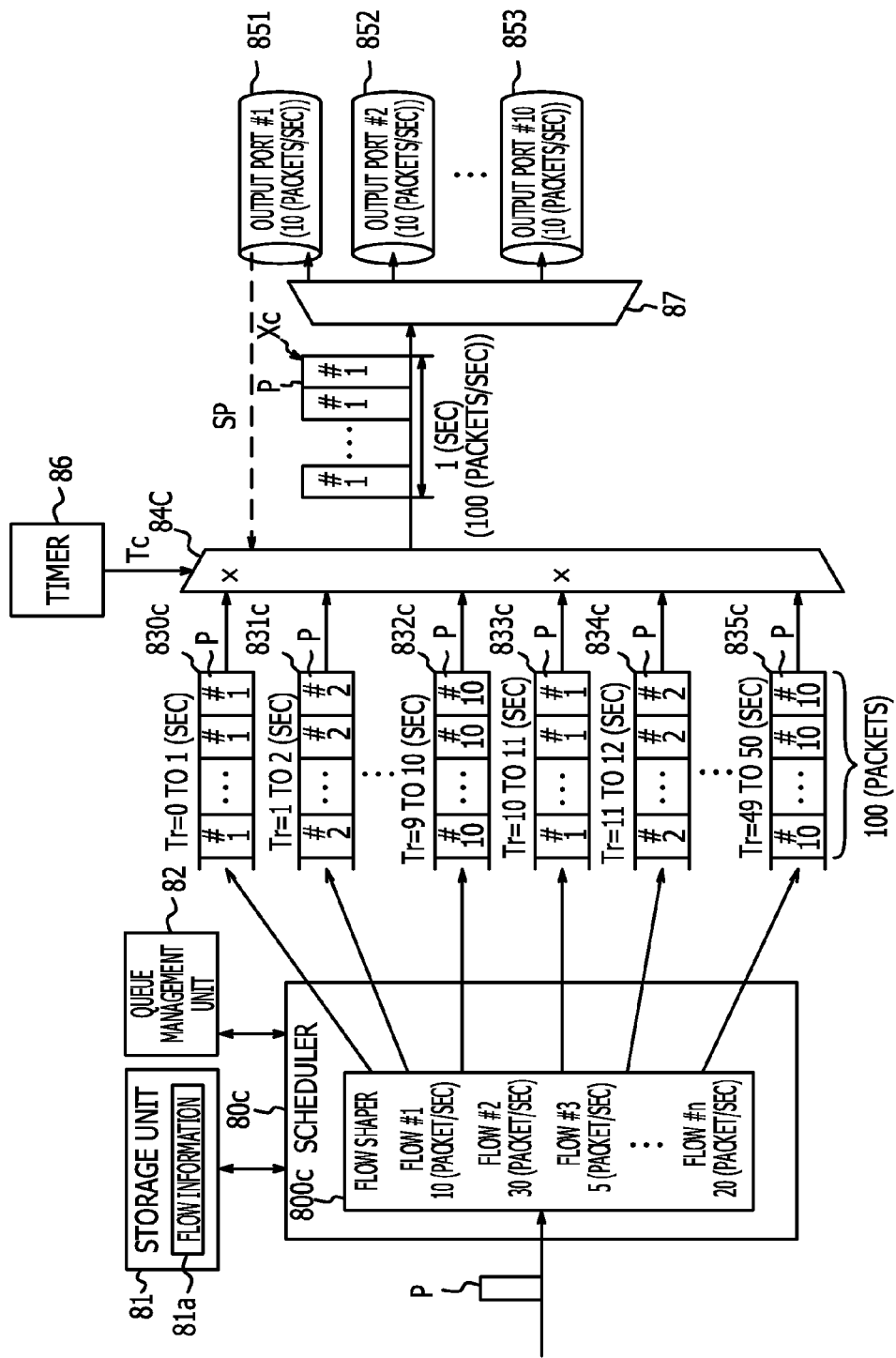
FIG. 7 is a configuration diagram illustrating a function configuration of an output processing unit according to a fourth comparative example.

FIG. 7 is a configuration diagram illustrating a function configuration of an output processing unit 913 according to a fourth comparative example. In FIG. 7, the same symbol is assigned for a configuration that is common with that of FIG. 5, and the description is omitted here. In this example, the symbol P indicates 10 packets, and the numbers in the packets P ("#1" to "#10") respectively correspond to the output ports (#1 to #10) 851 to 853.

The output processing unit 913 includes a scheduler 80*c*, the storage unit 81, the queue management unit 82, a plurality of queues 830*c* to 835*c*, and a selector 84*c*.

Similar to the third comparative example, the plurality of queues 830*c* to 835*c* stores packets P so as to sort the packets P into groups of packets that are to be output from the same output port from among the output ports 851 to 853. That is, the plurality of queues 830*c* to 835*c* are provided so as to correspond to the plurality of output ports 851 to 853. For example, the packets P that are to be output from the output port (#1) 851 are stored in the queues 830*c*, 833*c*, . . . , and the packets P that are to be output from the output port (#2) 852 are stored in the queues 831*c*, 834*c* . . . . Therefore, the problem of "Head of Line Blocking" is not caused.

In addition, the time width of the time period Tr of each of the queues 830*c* to 835*c* is 10 times of that of the third comparative example, that is, is one second that is the same as that of the second comparative example. Therefore, the selector 84*c* switches a queue from which the packets P are read, between the queues 830*c* to 835*c*, every other second.

The time width of each of the plurality of queues 830*c* to 835*c* is 10 times of that of the third comparative example, so that the capacity is also 10 time of that of the third comparative example. Therefore, each of the plurality of queues 830*c* to 835*c* stores packets P of a transmission amount that corresponds to a 10 second portion in the third comparative example at maximum. That is, the plurality of queues 830*c* to 835*c* corresponds to queues in which the packets P that are stored in the queues 830*a* to 833*a* in the second comparative example are rearranged so that packets that are to be output from the same output port from among the output ports 851 to 853 that are output destinations are gathered.

Due to a queue configuration, the number of queues becomes one tenth of that of the third comparative example, that is, is 50 the same number of that of the second comparative example.

In addition, the queues 830*c* to 835*c* are sorted for the output ports 851 to 853, so that the scheduler 80*c* does not include a port shaper similar to the third comparative example. The scheduler 80*c* includes the flow shaper 800*c*. In the flow shaper 800*c*, the rates of the flows #1 to #10 becomes 10 times of those of the third comparative example because the time width of the time period Tr of each of the queues 830*c* to 835*c* is 10 times that of the third comparative example.

On the other hand, the selector 84*c* reads packets P from each of the queues 830*c* to 835*c* within one second that is the time width. Therefore, the packets P that are stored in each of the queue 830*c* to 835*c* reaches the maximum amount (100 packets), in data Xc in the unit of second, which is output from the selector 84*c*, 10 pieces of packet P that are to be output from the same output from among the output ports 851 to 853 (#1 in FIG. 7) are included.

Thus, 100 packets are input to each of the output ports 851 to 853 per one second at maximum. Therefore, the burstiness is increased by 10 times that of the second comparative example and the third comparative example.

As described above, when the read rate of packets P (100 (packets/sec)) exceeds the output rate (10 (packets/sec)) of each of the output ports 851 to 853, the communication quality is reduced due to an increase in a read standby time because of frequent occurrence of read termination control. In order to avoid such problems, for example, a buffer that absorbs the burstiness may be provided in each of the output ports 851 to 853, but this is undesirable from the point of view of cost because the scale of the hardware is increased.

Simple Cyclicity of Queues

In addition, the problem of the simple cyclicity of queues is described using the configuration of the second comparative example as an example. Here, the simple cyclicity of queues indicates an operation to repeatedly switch the queue from which packets P are read, between the queues 830*b* to 835*b* in certain order for each certain time by the selector 84*b*. That is, the simple cyclicity of queues corresponds to an operation to cycle the queues 830*b* to 835*b* in accordance with a certain rule.

Figure 8:
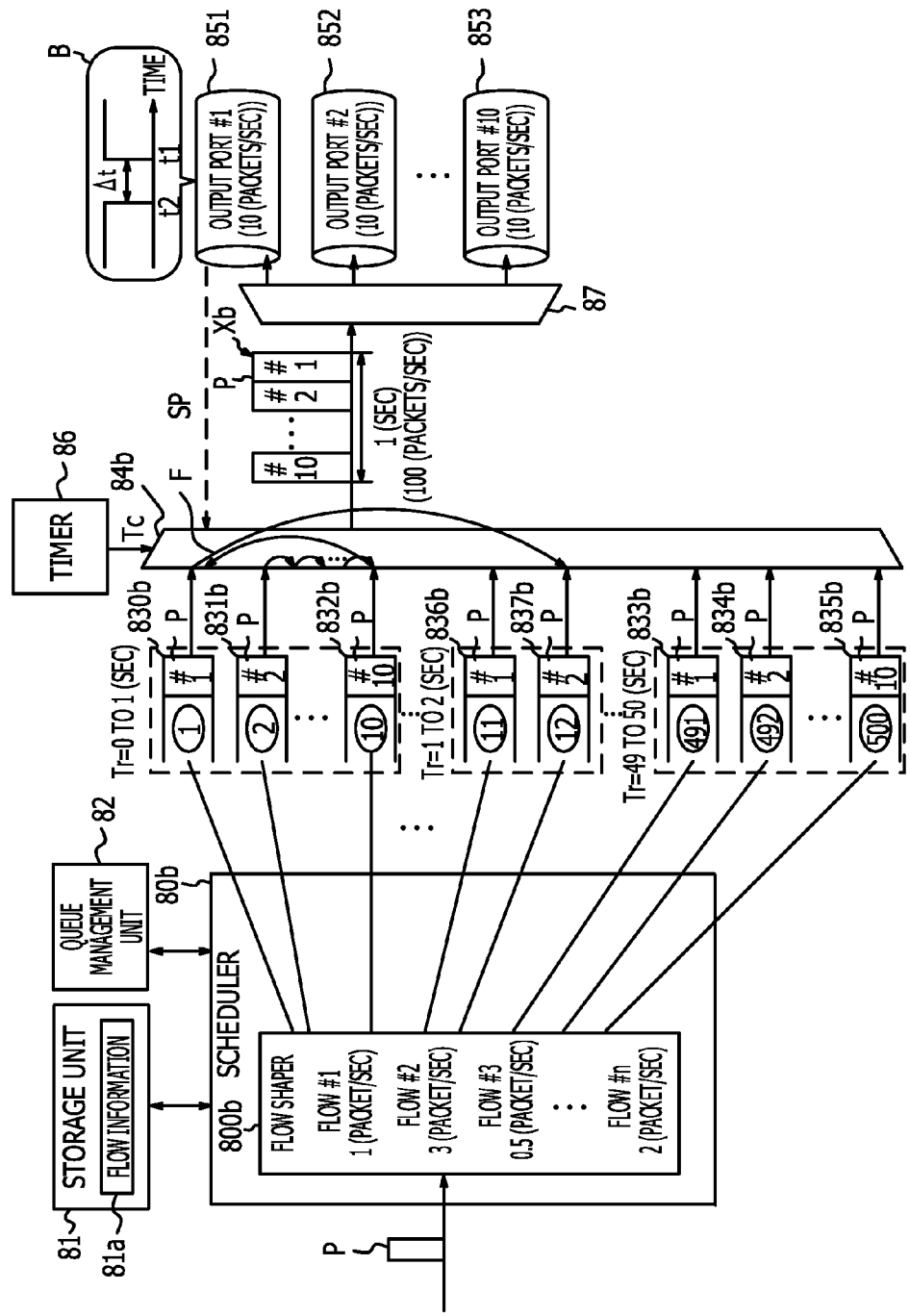
FIG. 8 is a configuration diagram illustrating a problem of simple cyclicity of queues.

FIG. 8 is a configuration diagram illustrating a problem of the simple cyclicity of queues. In FIG. 8, the same symbol is assigned for a configuration that is common with that of FIG. 6, and the description is omitted herein. The queues 836*b* and 837*b* respectively store packets P that are to be output from the output ports (#1 and #2) 851 and 852 in the time period Tr of "1 to 2 (sec)".

In FIG. 8, the numbers that are assigned in the vicinity of the queues 830*b* to 837*b* (see "1" to "500" surrounded by the circle) indicate selection order of the queues 830*b* to 837*b* by the selector 84*b*. The selector 84*b* selects one of the queues 830*b* to 837*b* in ascending order of the numbers (#1 to #10) of the output ports 851 to 853 for each of the time periods Tr. Such a selection order is fixed, so that the selector 84*b* keeps the simple cyclicity of queues.

Here, it is assumed that the pause control is performed by the output port (#1) 851, the read processing of the queue 830*b* of the time period Tr of "0 to 1 (sec)", which stores packets P that are to be output from the output port (#1) 851 is terminated only by one second, and then the pause control is released. In this case, after the selector 84*b* selects the queues 831*b* and 832*b* of the time period Tr of "0 to 1 (sec)" other than the queue 830*b* for which the read processing of which is terminated, the selector 84*b* selects the queue 830*b*, and then selects the queue 837*b* of the time period Tr of "1 to 2 (sec)" (see the symbol F). That is, the selector 84*b* selects not the queue 836*b* of the time period Tr of "1 to 2 (sec)" that corresponds to the time Tc, but the queue 830*b* of the previous time period Tr of "0 to 1 (sec)" only for the output port (#1) 851 at the time Tc of "1 to 2 (sec)".

Thus, in this case, the selection order of the simple cyclicity of queues ("1", "2", ..., "10", and "11", "12", ... ) is not performed, and the queues 830*b* to 837*b* are selected in accordance with a different selection order ("2", ..., and "10", "1", "12", ... ). That is, when the pause control is released, the simple cyclicity of queues is lost by selecting the queue 830*b* the packet P of which is not read yet.

In such selection processing, the configuration of the selector 84*b* is complicated, so that the scale of the hardware is increased.

In addition, the problem that is associated with the pause control is not only the simple cyclicity of queues. The diagram illustrated by the symbol B indicates the output bandwidth of the output port (#1) 851 for the time. When the pause control is performed at the time t1, and the pause control is released at the time t2, a packet P is not output in the time period Δt (=t2−t1) until the pause control is released, so that the problem occurs that a free bandwidth occurs.

First Embodiment

In a communication device according to a first embodiment, the burstiness that is the problem in the third comparative example is reduced by dividing packets that are stored in a single queue into groups of packets that are read at one time using three selectors, so that the communication quality is improved.

Figure 9:
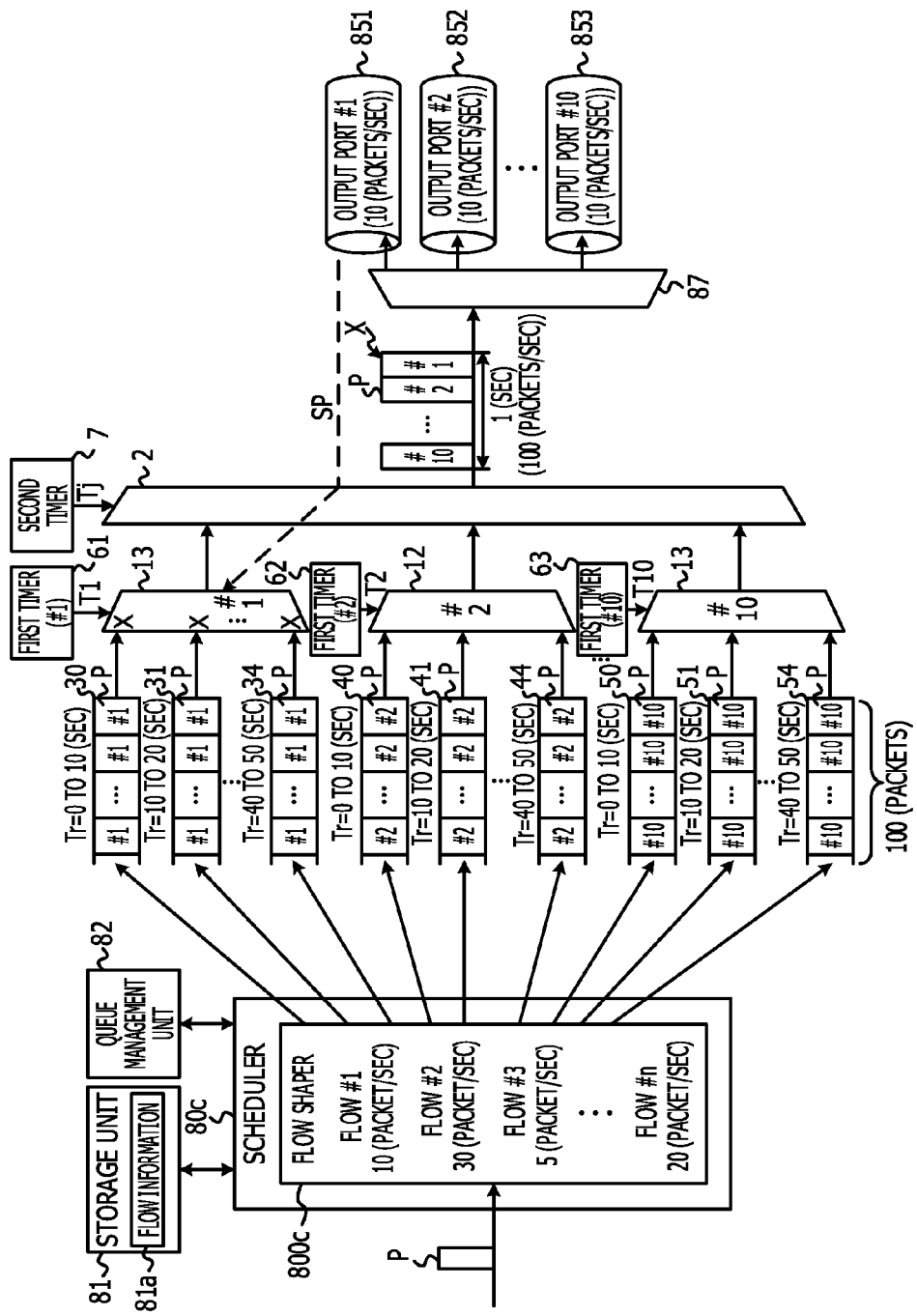
FIG. 9 is a configuration diagram illustrating a function configuration of an output processing unit according to a first embodiment.

FIG. 9 is a configuration diagram illustrating a function configuration of an output processing unit 913 according to the first embodiment. In FIG. 9, the same symbol is assigned for a configuration that is common with that of FIG. 7, and the description is omitted here. In this example, the symbol P indicates 10 packets, and the numbers ("#1" to "#10") in the packets P respectively correspond to the output ports (#1 to #10) 851 to 853.

The output processing unit 913 includes the scheduler 80*c*, the storage unit 81, the queue management unit 82, a plurality of queues 30, 31, ..., and 34, a plurality of queues 40, 41, ..., and 44, ..., and a plurality of queues 50, 51, ..., and 54, a plurality of first selectors 11 to 13, and a second selector 2. The output processing unit 913 further includes a plurality of first timers 61 to 63 and a second timer 7.

The plurality of queues 30, 31, ..., and 34, the plurality of queues 40, 41, ..., and 44, ..., and the plurality of queues 50, 51, ..., and 54, store packets P so as to sort the packets into groups of packets that are to be output from the same output port in the same time period Tr, from among the plurality of output ports 851 to 853. The time width of each of plurality of queues 30, 31, ..., and 34, the plurality of queues 40, 41, ..., and 44, ..., and the plurality of queues 50, 51, ..., and 54 is 10 seconds similar to that of the third comparative example, and has the capacity in which 10 pieces of packet P are allowed to be stored at maximum.

For example, the queue 30 stores packets P that are to be output from the output port (#1) 851 in the time period Tr of "0 to 10 (sec)", and the queue 31 stores packets P that are to be output from the output port (#1) 851 in the time period Tr of "10 to 20 (sec)". In addition, the queue 34 stores packets P that are to be output from the output port (#1) 851 in the time period Tr of "40 to 50 (sec)". That is, the packets P that are to be output from the output port (#1) 851 are stored so as to be sorted into the 5 queues 30, 31, . . . , and 34 that respectively correspond to the time periods Tr of "0 to 10 (sec)", "10 to 20 (sec)", . . . , and "40 to 50 (sec)".

The queue 40 stores packets P that are to be output from the output port (#2) 852 in the time period Tr of "0 to 10 (sec)", and the queue 41 stores packets P that are to be output from the output port (#2) 852 in the time period Tr of "10 to 20 (sec)". In addition, the queue 44 stores packets P that are to be output from the output port (#2) 852 in the time period Tr of "40 to 50 (sec)". That is, the packets P that are to be output from the output port (#2) 852 are stored so as to be sorted into the 5 queues 40, 41, . . . , and 44 that respectively correspond to the time periods Tr of "0 to 10 (sec)", "10 to 20 (sec)", . . . , and "40 to 50 (sec)".

The queue 50 stores packets P that are to be output from the output port (#10) 853 in the time period Tr of "0 to 10 (sec)", and the queue 51 stores packets P that are to be output from the output port (#10) 853 in the time period Tr of "10 to 20 (sec)". In addition, the queue 54 stores packets P that are to be output from the output port (#10) 853 in the time period Tr of "40 to 50 (sec)". That is, the packets P that are to be output from the output port (#10) 853 are stored so as to be sorted into the 5 queues 50, 51, . . . , and 54 that respectively correspond to the time periods Tr of "0 to 10 (sec)", "10 to 20 (sec)", . . . , and "40 to 50 (sec)". Thus, the number of queues becomes 50 (10 (the number of output ports)×5) that is the same as that of the fourth comparative example, at most.

In FIG. 9, the illustration of two queues that correspond to the time periods Tr of "20 to 30 (sec)" and "30 to 40 (sec)" is omitted herein. In addition, the illustration of queues that store packets that are to be output from the other output ports (#3 to #9) from among the 10 output ports (#1 to #10) is also omitted herein.

The plurality of first selectors (#1 to #10) 11 to 13 are provided so as to respectively correspond to the plurality of output ports (#1 to #10) 851 to 853. The first selectors 11 to 13 respectively select one of the queues 30, 31, . . . , and 34, one of the queues 40, 41, . . . , and 44, . . . , and one of the queues 50, 51, . . . , and 54, which store packets P that are output from the corresponding output ports from among the plurality of output ports 851 to 853. In FIG. 9, the illustration of the first selectors (#3 to #9) that respectively correspond to the other output ports (#3 to #9) from among the 10 output ports (#1 to #10) is omitted herein.

In addition, the first timers (#1 to #10) 61 to 63 respectively notify the plurality of first selectors (#1 to #10) 11 to 13 of the times from among the times T1 to T10. The first selectors (#1 to #10) 11 to 13 respectively select one of the queues 30, 31, . . . , and 34, one of the queues 40, 41, . . . , and 44, . . . , and one of the queues 50, 51, . . . , and 54 of the time periods Tr, which correspond to the times from among the times T1 to T10. That is, each of the first selectors (#1 to #10) 11 to 13 measure, 10 seconds of the time width based on the time from among the times T1 to T10.

The first selector (#1) 11 that corresponds to the output port (#1) 851 selects a queue of the time period Tr that corresponds to the time T1 from among the 10 queues 30, 31, . . . , and 34 that store packets P that are to be output from the output port (#1) 851. For example, the first selector (#1) 11 select the queue 30 of the time period Tr of "0 to 1 (sec)" in the case of the time T1 of "0.5 (sec)" and selects the queue 31 of the time period Tr of "1 to 2 (sec)" in the case of the time T1 of "1.5 (sec)".

The first selector (#2) 12 that corresponds to the output port (#2) 852 selects a queue of the time period Tr that corresponds to the time T2 from among the 10 queues 40, 41, . . . , and 44 that store packets P that are to be output from the output port (#2) 852. For example, the first selector (#2) 12 selects the queue 40 of the time period Tr of "0 to 1 (sec)" in the case of the time T2 of "0.5 (sec)", and selects the queue 41 of the time period Tr of "1 to 2 (sec)" in the case of the time T2 of "1.5 (sec)".

The first selector (#10) 13 that corresponds to the output port (#10) 853 selects a queue of the time period Tr that corresponds to the time T10 from among the 10 queues 50, 51, . . . , and 54 that store packets P that are to be output from the output port (#10) 853. For example, the first selector (#10) 13 selects the queue 50 of the time period Tr of "0 to 1 (sec)" in the case of the time T10 of "0.5 (sec)", and selects the queue 51 of the time period Tr of "1 to 2 (sec)" in the case of the time T10 of "1.5 (sec)".

As described above, the first selectors (#1 to #10) 11 to 13 respectively switch queues from which packets P that are to be output from the output ports 851 to 853 are read, between the queues 30, 31, . . . , and 34, the queues 40, 41, . . . , and 44, . . . , and the queues 50, 51, . . . , and 54 each time the time period Tr elapses. That is, the first selector 11 to 13 respectively switch the queue from which packets P are read, between the queues 30, 31, . . . , and 34, the queues 40, 41, . . . , and 44, . . . , and the queues 50, 51, . . . , and 54 each time 10 seconds of the time width elapses. Thus, the packets P that are stored in each of the queues 30, 31, . . . , and 34, the queues 40, 41, . . . , and 44, the queues 50, 51, . . . , and 54 are read within the time period Tr.

The second selector 2 switches the first selector from which packets P are output, between the plurality of first selectors 11 to 13 at time intervals in accordance with the output rates (10 (packets/sec)) of the plurality of output ports 851 to 853. That is, the second selector 2 selects the output port from which packets P are to be output, from the output ports 851 to 853 by selection of the first selectors 11 to 13.

The second timer 7 notifies the second selector 2 of a time Tj. The second selector 2 measures the above-described time interval based on the time Tj, and switches the first selector between the first selectors 11 to 13 at the time intervals.

In this example, the output rate of each of the output ports 851 to 853 is 10 (packets/sec), and the number of ports is 10, so that the second selector 2 reads packets P at the rate of 100 (packets/sec) (10 (the number of output ports)×10 (packets/sec)). Therefore, the second selector 2 switches the first selector between the first selectors 11 to 13 at the time intervals of "0.1 (sec)" (10/100 (packets/sec)) so that the output rate of each of the output ports (#1 to #10) 851 to 853 is maintained.

Thus, when the packets P that are stored in each of the queues 30 to 54 reaches the maximum amount, in data X in the unit of second, which is output from the second selector 2, 10 pieces (#1 to #10) of packet P that are to be output from the each of the output ports 851 to 853 are included. That is, the 10 packets are input to each of the output ports 851 to 853 per one second, so that the low burstiness is achieved similar to the second comparative example. As a result, frequent occurrence of pause control and packet loss are suppressed, so that the communication quality is improved.

As described above, the first selectors 11 to 13 respectively select one of the queues 30, 31, . . . , and 34, one of the queues 40, 41, . . . , and 44, . . . , and one of the queues 50, 51, . . . , and 54, which correspond to the time periods Tr for the output ports 851 to 853, and the second selector 2 may adjust amounts of packets that are to be output from the first selectors 11 to 13 in the unit time, based on the output rates of the output ports 851 to 853 respectively. Thus, in the embodiment, differently from the fourth comparative example, it is avoided that input of packets P that exceed the output rates of the output ports 851 to 853 is performed.

In addition, the time interval at which the first selector is switched between the first selectors 11 to 13 is decided regardless of the length of the time periods Tr of the queues 30 to 54, that is, the time width. Therefore, similar to the fourth comparative example, the time width is extended to 10 seconds by increasing the capacities of the queues 30 to 54, so that the scale of the hardware may be reduced. That is, in the embodiment, the number of queues is caused to be the same as those of the fourth comparative example (50 queues).

In addition, in the queues 30, 31, ..., and 34, the queues 40, 41, ..., and 44, ..., and the queues 50, 51, ..., and 54, packets P are stored so as to be sorted into groups of packets that are to be output from the same output port from among the plurality of output ports 851 to 853. The first selectors 11 to 13 respectively switch the queues from which the packets P are output, between the queues 30, 31, ..., and 34, the queues 40, 41, ..., and 44, and the queues 50, 51, ..., and 54, for the output ports 851 to 853. Therefore, the problem of "Head of Line Blocking" is not caused.

For example, when the first selector (#1) 11 receives a termination instruction signal Sp from the output port (#1) 851 through the second selector 2, the first selector (#1) 11 terminates read processing of the queues 30 to 34 (see x mark). On the other hand, the other first selectors (#2 to #10) 12 to 13 do not terminate read processing of the queues 40, 41, ..., and 44, ..., and the queues 50, 51, ..., and 54. Thus, transmission of the packets P that are to be output from the output port (#1) 851 is merely performed.

In addition, the first selectors (#1 to #10) 11 to 13 are respectively provided for the output ports (#1 to #10) 851 to 853, and measure the time intervals at which the queues are switched between the queues 30 to 54 by the respective first timers (#1 to #10) 61 to 63. Therefore, each of the first selectors (#1 to #10) 11 to 13 may perform a cyclic operation for queues individually even when the pause control is performed. Thus, in the embodiment, the simple cyclicity of queues is maintained.

For example, it is assumed that the first selector (#1) 11 terminates read processing of packets P in response to a termination instruction signal Sp in a state in which the first selectors (#1 to #10) 11 to 13 respectively have selected the queues 30, 40, ..., and 50 of the time period Tr of "0 to 10 (sec)". At that time, the first timer (#1) 61 terminates the count of the time T1.

When the pause control is released after 10 seconds from the termination of the read processing, the first selector (#1) 11 resumes the read processing of packets P from the queue 30 of the time period Tr of "0 to 10 (sec)" in accordance with the time T1. At that time, the first selectors (#2 to #10) 12 to 13 read packets P from the queue 41, ..., and 51 of the time period Tr of "10 to 20 (sec)", in accordance with the times T2 to T10.

Thus, the read termination operation of the first selector (#1) 11 does not affect the read operation of the other first selectors (#2 to #10) 12 to 13, so that the simple cyclicity of queues is maintained. In addition, as described above, by performing the pause control, deviation of the time periods Tr of the queue from which packets P are output, from among the queues 30 to 54, occurs between the output ports (#1 to #10) 851 to 853. However, the output ports (#1 to #10) operate independently of each other, so that deviation of the time periods Tr of the queues between the output ports (#1 to #10) 851 to 853 is not a problem.

Second Embodiment

As described above, the first selectors (#1 to #10) 11 to 13 respectively terminate read processing of packets P in accordance with the pause control (termination control) of the output ports (#1 to #10) 851 to 853. At that time, a free bandwidth occurs before the pause control is released.

Figure 10:
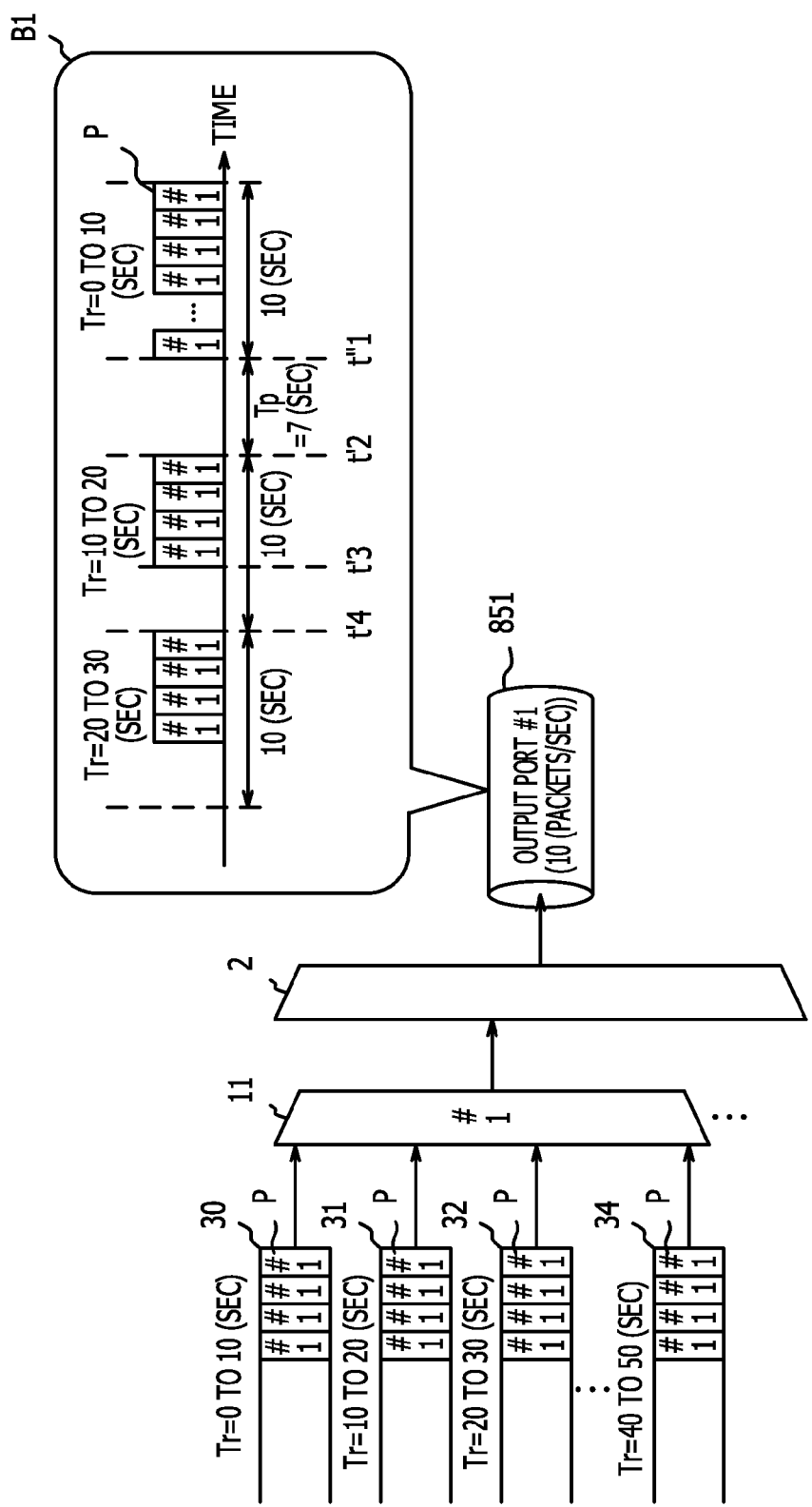
FIG. 10 is a configuration diagram illustrating an operation at the time of pause control.

FIG. 10 is a configuration diagram illustrating an operation at the time of pause control. FIG. 10 illustrates the configuration that is related to the output port (#1) 851 of the configuration illustrated in FIG. 9 and a state of packets P that are output from the output port (#1) 851 for the time, in the area indicated by the symbol B1. In FIG. 10, the same symbol is assigned for a configuration that is common with that of FIG. 9, and the description is omitted herein.

First, the first selector (#1) 11 reads packets P from the queue 30 of the time period Tr of "0 to 10 (sec)", and outputs the packets P from the output port (#1) 851 through the second selector 2. After that, at the time t1, the output port (#1) executes the pause control, the first selector (#1) 11 terminates the read processing. The pause control is released at the time t2 after seven seconds, but the packets P are not output during the execution of the pause control, so that a free bandwidth occurs between the times t1 to t2.

After that, the first selector (#1) 11 selects the queue 31 of the time period Tr of "10 to 20 (sec)", and reads packets P from the queue 31. Here, it is assumed that 40 packets are stored in the queue 31.

The first selector (#1) 11 completes the read processing of the 40 packets of the queue 31 at the time t3 after four seconds from the time t2. However, the first selector (#1) 11 keeps the selection of the queue 31 in the time period Tr, even when the queue 31 is empty (see the dotted line). That is, the first selector (#1) 11 keeps to select the queues 31 until the time t4 after six seconds from the time at which the queue 31 has become empty. Therefore, a free bandwidth occurs between the times t3 to t4 (six seconds).

In the embodiment, after the pause control is released, the selection time of the empty queue is reduced by the termination time at most, so that the unnecessary read time (time between the times t3 to t4) of the empty queue is omitted, and the termination time (time between the times t1 to t2) that is caused by the pause control is taken back.

Figure 11:
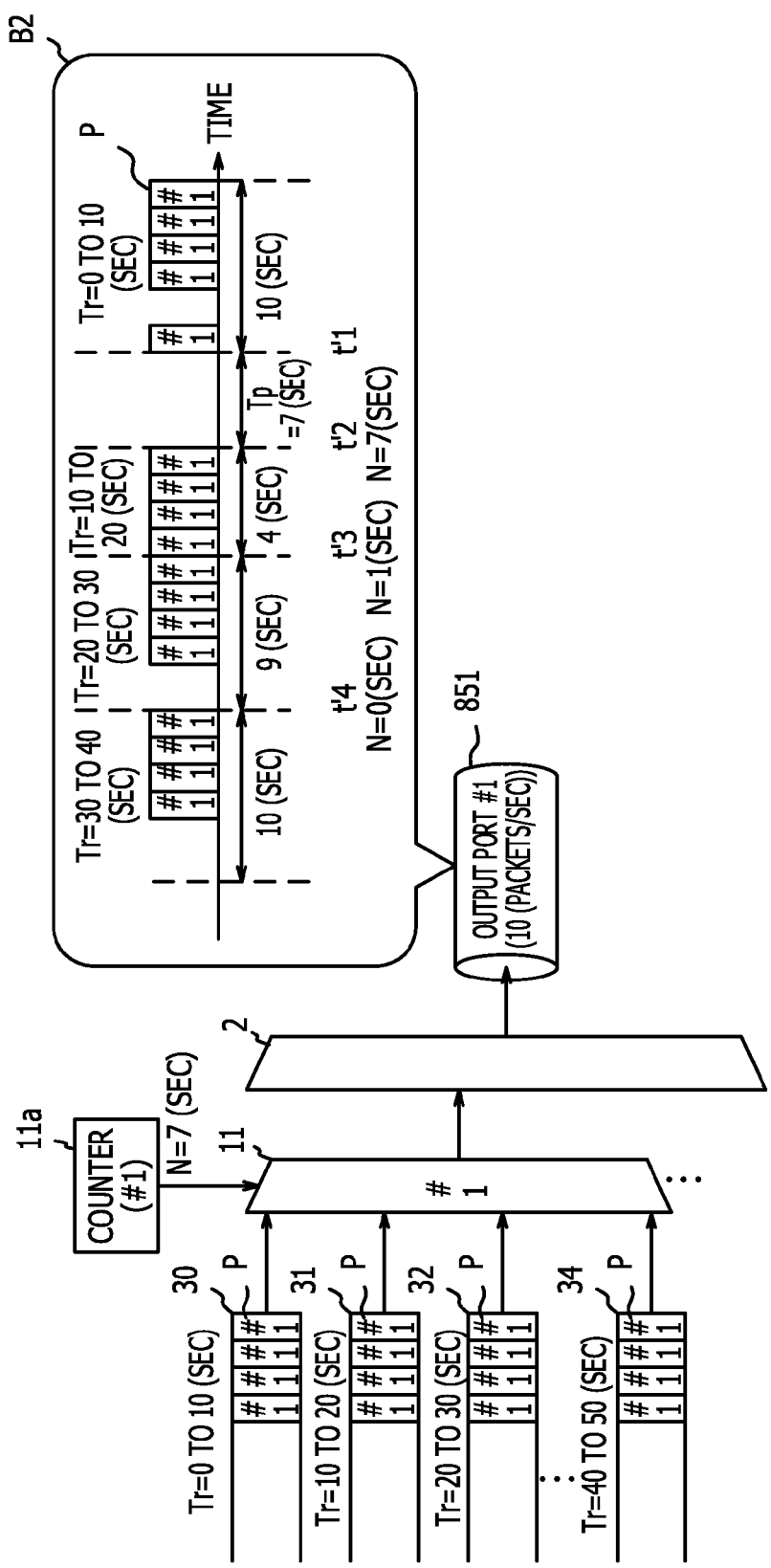
FIG. 11 is a configuration diagram illustrating an operation of reducing a read time of an empty queue in a second embodiment.

FIG. 11 is a configuration diagram illustrating an operation of reducing the read time of an empty queue in the second embodiment. FIG. 11 illustrates the configuration that is related to the output port (#1) 851 of the configuration illustrated in FIG. 9 and a state of packets P that are output from the output port (#1) 851 for the time, in the area indicated by the symbol B2. In FIG. 11, the same symbol is assigned for a configuration that is common with that of FIG. 10, and the description is omitted herein.

A counter (#1) 11a measures a termination time Tp in which the first selector (#1) 11 terminates read processing of packets P by the pause control, and notifies the first selector (#1) 11 of the measurement. The counter (#1) 11a performs start and termination of the measurement in response to an instruction from the first selector (#1) 11. In FIG. 11, the illustration of counters (#2 to #10) that respectively correspond to the other first selectors (#2 to #10) 12 to 13 is omitted, but each of the counters (#2 to #10) performs an operation that is similar to that of the counter (#1) 11a.

As illustrated in the symbol B2, the first selector (#1) 11 reads packets P from the queue 30 of the time period Tr of "0 to 10 (sec)", and outputs the packets P from the output port (#1) 851 through the second selector 2. After that, at the time t1, the output port (#1) performs the pause control, and the first selector (#1) 11 terminates the read processing, and instructs the counter (#1) 11a to start measurement of the termination time Tp.

The pause control is released at the time t2 after seven seconds from the start of the measurement (that is, the termination time Tp is seven seconds). When the first selector (#1) 11 receives a notification signal that is used to notify release of the pause control, from the output port (#1) 851, the first selector (#1) 11 instructs the counter (#1) 11a to terminate the measurement of the termination time Tp. At that time, the counter (#1) 11a indicates that the counter value N is seven seconds, in the first selector (#1) 11.

After that, the first selector (#1) 11 selects the queue 31 of the time period Tr of "10 to 20 (sec)", and reads packets P from the queue 31. Here, when 40 packets are merely stored in the queue 31, the queue 31 becomes empty at the time t3 after four seconds from the start of the read processing (time t2).

At the time t3, the remaining of the time period Tr is six seconds (time width 10 (sec)−4 (sec)), and is less than the counter value N of seven seconds. Therefore, the first selector (#1) 11 skeps read processing of the queue 31 that has become empty, and selects the queue 32 of the next time period Tr of "20 to 30 (sec)". That is, the first selector (#1) 11 switches the queue before the time period Tr (time width 10 (sec)) elapses, by moving the start of the read processing of the queue 32 ahead six seconds.

As a result, six seconds from among the termination time Tp (time between the times t1 to t2) that is caused by the pause control is taken back. After skipping the queue 31, the first selector (#1) 11 instructs the counter (#1) 11a to subtract six seconds that is the time to be reduced from the counter value N of seven seconds. Therefore, at the time t3, the counter value N becomes one second (=7 (sec)−6 (sec)).

Therefore, also when 40 packets are merely stored in the queue 32 of the next time period Tr of "20 to 30 (sec)", after the queue 32 becomes empty, the time of the counter value N (=1 (sec)) portion is taken back. For example, the queue 32 becomes empty after four seconds from the start of the read processing (time t3), and then the first selector (#1) 11 performs read processing on the queue 32 only for five seconds unnecessarily, and selects a queue (not illustrated) of the next time period Tr of "30 to 40 (sec)" at the time t4. That is, the first selector (#1) 11 switch the queue before the time period Tr (time width 10 (sec)) elapses by moving the start of the read processing of the queue 32 ahead only one second.

As a result, the counter value N becomes 0 second (=1 (sec)−1 (sec)), so that the first selector (#1) 11 does not reduce the selection times of the empty queues 31 and 32 after the time t4 as long as the pause control is not performed again.

As described above, after release of the pause control, the first selector (#1) 11 reduces the selection times of one or more empty queues by the termination time Tp at most. That is, in the one or more empty queues 31 and 32, read processing of the termination time Tp portion at most from among the time period Tr is skipped. Thus, the cyclic operation of the first selector (#1) 11 is moved ahead, and the termination time Tp (time between the times t1 to t2) that is caused by the pause control is taken back.

In the embodiment, as the termination time Tp by the pause control is longer, a larger read time is reduced, so that an interval of packets that are to be output from each of the output ports 851 to 853 is reduced, and the burstiness is increased. Therefore, by setting an upper limit value (first upper limit value) that is smaller than the termination time Tp, to the counter value N, and limiting a total of the times to be reduced from the selection times of the one or more empty queues 31 and 32, an increase in the burstiness may be suppressed.

Figure 12:
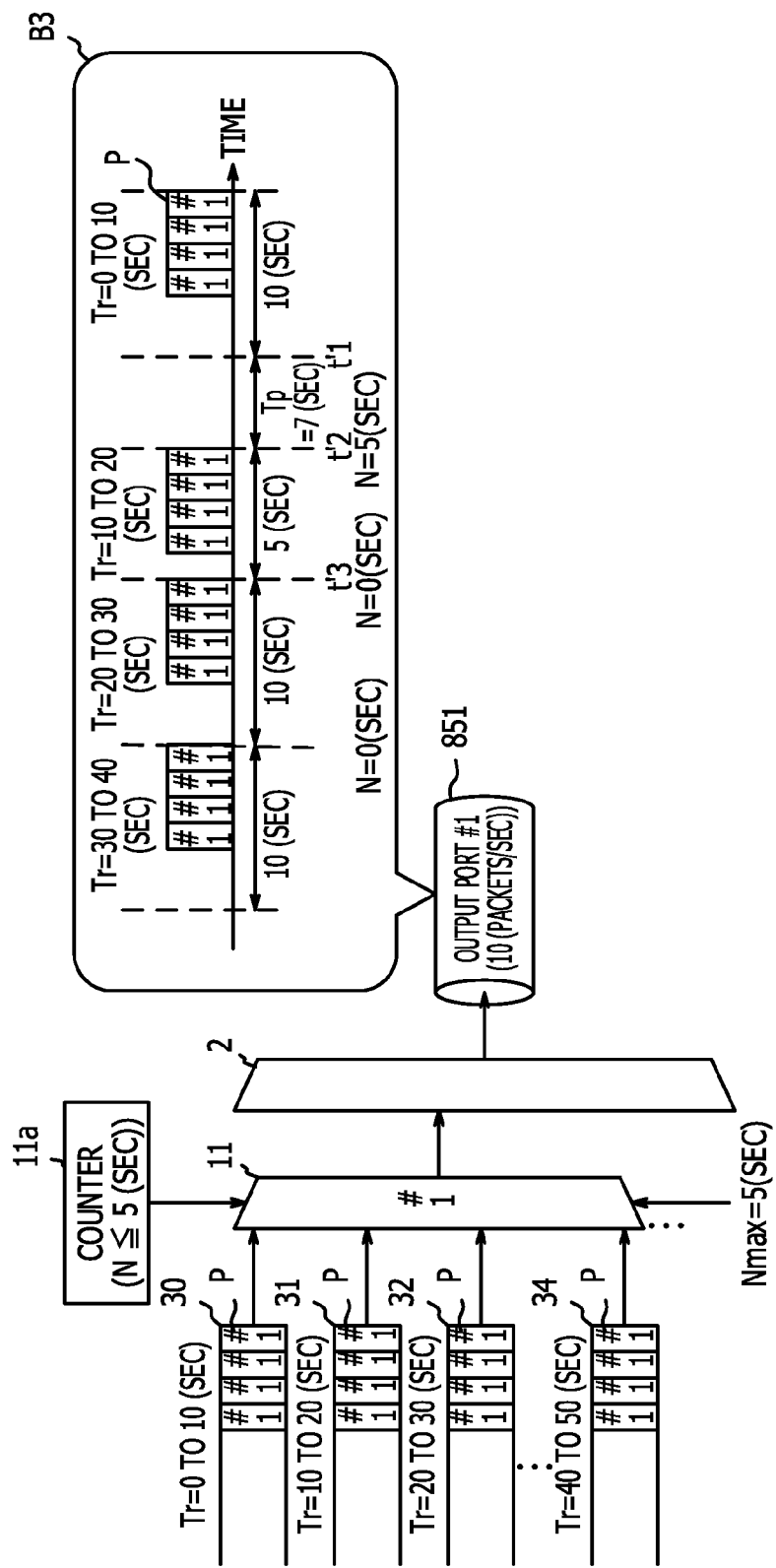
FIG. 12 is a configuration diagram illustrating an operation of reducing a read time of an empty queue when an upper limit is set to a time to be reduced.

FIG. 12 is a configuration diagram illustrating an operation for reducing read times of empty queues when an upper limit is set to times to be reduced. FIG. 12 illustrates the configuration that is related to the output port (#1) 851 of the configuration illustrated in FIG. 9 and a state of packets P that are output from the output port (#1) 851 for the time, in the area indicated by the symbol B3. In FIG. 12, the same symbol is assigned for a configuration that is common with that of FIG. 11, and the description is omitted herein.

In this example, the counter value N is limited to an upper limit value Nmax. The upper limit value Nmax is set to one of the counter (#1) 11a and the first selector (#1) 11 as a register. The upper limit value Nmax is set at five seconds as an example, but there is no limit for the upper limit value Nmax. However, when the upper limit value Nmax is set at 0 (sec), the read time of an empty queue is not reduced, so that the burstiness that is similar to that of the example in FIG. 10 is maintained.

As illustrated in the symbol B3, the first selector (#1) 11 reads packets P from the queue 30 of the time period Tr of "0 to 10 (sec)", and outputs the packets P from the output port (#1) 851 through the second selector 2. After that, at the time t1, the output port (#1) performs the pause control, and the first selector (#1) 11 terminates the read processing, and instructs the counter (#1) 11a to start measurement of the termination time Tp.

The pause control is released at the time t2 after seven seconds from the start of the measurement (that is, the termination time Tp is seven seconds). When the first selector (#1) 11 receives a notification signal that is used to notify release of the pause control, from the output port (#1) 851, the first selector (#1) 11 instructs the counter (#1) 11a to terminate the measurement of the termination time Tp. At that time, the counter (#1) 11a indicates that the counter value N is five seconds because the termination time Tp of seven seconds exceeds the upper limit value Nmax of five seconds.

After that, the first selector (#1) 11 selects the queue 31 of the time period Tr of "10 to 20 (sec)", and reads packets P from the queue 31. Here, when 40 packets are merely stored in the queue 31, the queue 31 becomes empty after four seconds from the start of read processing (time t2).

At that time, the remaining of the time period Tr is six seconds (=time width 10 (sec)−4 (sec)), and is more than the counter value N of five seconds. Therefore, the first selector (#1) 11 performs read processing on the queue 31 that has become empty by one second (=6 (sec)−5 (sec)), and selects the queue 32 of the next time period Tr of "20 to 30 (sec)". That is, the first selector (#1) 11 switches the queue to another queue before the time period Tr (time width 10 (sec)) elapses, that is, at the time t3 after five seconds from the selection of the queue 31, by moving the start of the read processing of the queue 32 ahead five seconds.

As a result, the counter value N becomes 0 (sec) (remaining time 5 (sec)−time to be reduced 5 (sec)), so that the first selector (#1) 11 does not reduce the selection times of the empty queues 31 and 32 after the time t3 as long as the pause control is not performed again.

As described above, the termination time Tp that is to be taken back is limited by limiting a total of times to be reduced from the selection times of the one or more empty queues 31 and 32 to an upper limit value that is smaller than the termination time Tp, so that an increase in the burstiness may be suppressed.

Also, the above-described effect may be obtained by limiting reduction of the selection times of the empty queues 31 and 32 for each queue. That is, the times to be reduced from the selection times of the one or more empty queues 31 and 32 may be limited to an upper limit value (second upper limit value) that is smaller than the time period Tr.

Figure 13:
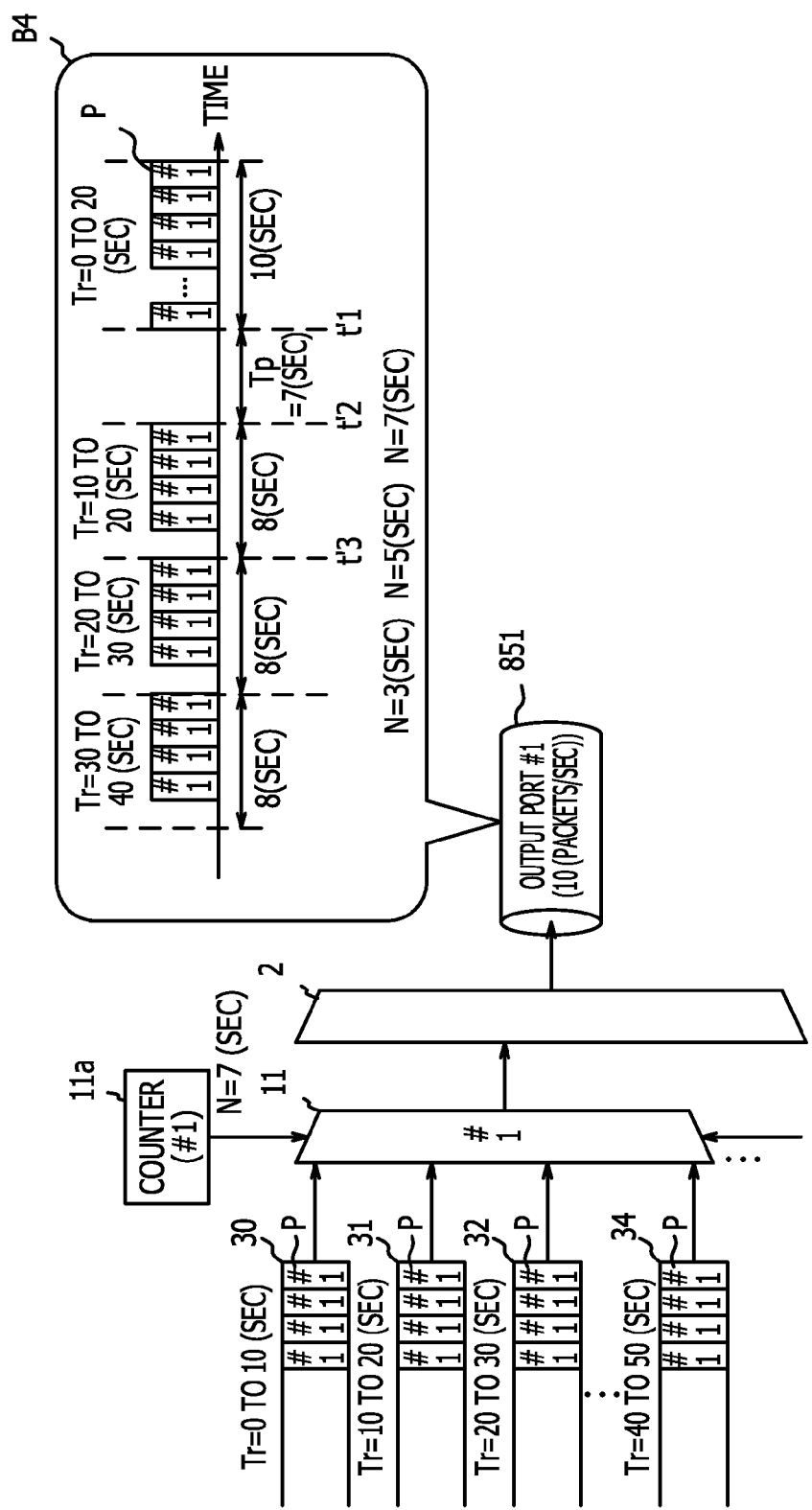
FIG. 13 is a configuration diagram illustrating an operation of reducing a read time of an empty queue when an upper limit is set to a time to be reduced for each of the empty queues.

FIG. 13 is a configuration diagram illustrating an operation for reducing read times of empty queues when an upper limit is set to a time to be reduced for each of the empty queues. FIG. 13 illustrates the configuration that is related to the output port (#1) 851 of the configuration illustrated in FIG. 9 and a state of packets P that are output from the output port (#1) 851 for the time, in the area indicated by the symbol B4. In FIG. 13, the same symbol is assigned for a configuration that is common with that of FIG. 11, and the description is omitted herein.

In this example, a time to be reduced regarding read processing of an empty queue is limited to an upper limit value Lm. The upper limit value Lm is set to the first selector (#1) 11 as a register. The setting value of the upper limit value Lm is set at two seconds as an example. Therefore, the first selector (#1) 11 selects the empty queue at least for eight seconds (time interval 10 (sec)−upper limit value 2 (sec)). There is no limit for the upper limit value Lm, and when the upper limit value Lm is set at 0 second, the read time of the empty queue is not reduced, so that the burstiness that is similar to that of the example in FIG. 10 is maintained.

As illustrated in the symbol B4, the first selector (#1) 11 reads packets P from the queue 30 of the time period Tr of "0 to 10 (sec)", and outputs the packets P from the output port (#1) 851 through the second selector 2. After that, at the time t1, the output port (#1) performs the pause control, and the first selector (#1) 11 terminates the read processing, and instructs the counter (#1) 11a to start measurement of the termination time Tp. In this example, it is assumed that an upper limit value Nmax of the counter value N is not set.

The pause control is released at the time t2 after seven seconds from the start of the measurement (that is, the termination time Tp is seven seconds). When the first selector (#1) 11 receives a notification signal that is used to notify the release of the pause control, from the output port (#1) 851, the first selector (#1) instructs the counter (#1) 11a to terminate the measurement of the termination time Tp. At that time, the counter (#1) 11a indicates that the counter value N is seven seconds.

After that, the first selector (#1) 11 selects the queue 31 of the time period Tr of "10 to 20 (sec)", and reads packets P from the queue 31. Here, when 40 packets are merely stored in the queue 31, the queue 31 becomes empty after four second from the start of read processing (time t2).

At that time, the remaining of the time period Tr is six seconds (time width 10 (sec)−4 (sec)), and is less than the counter value N of seven seconds, but a time to be reduced regarding the read processing is limited to an upper limit value Lm of eight seconds. Therefore, the first selector (#1) 11 performs read processing on the queue 31 that has become empty only for four seconds (=8 (sec)−4 (sec)), and selects the queue 32 of the next time period Tr of "20 to 30 (sec)". That is, the first selector (#1) 11 switches the queue to another queue before the time period Tr (time width 10 (sec)) elapses, that is, at the time t3 after eight seconds from the selection of the queue 31, by moving the start of the read processing of the queue 32 ahead two seconds.

As a result, the counter value N becomes five seconds (the remaining time 7 (sec)−time to be reduced 2 (sec)), so that also in the queue 32 of the next time period Tr of "20 to 30 (sec)", a time of the read processing is reduced by two seconds. At that time, the counter value N becomes three seconds (remaining time 5 (sec)−time to be reduced 2 (sec)). The illustration for the reduction of the read processing of the empty queue is omitted herein, but the subsequent processing is also executed similarly.

As described above, by limiting times to be reduced from the selection times of the one or more empty queues 31 and 32 to the upper limit value Lm that is smaller than the time period Tr, an increase in the burstiness that is associated with the reduction in the time of the read processing is suppressed.

Operations of the first selectors 11 to 13 and the second selector 2 when the above-described upper limit values Nmax and Lm are used are described below.

Figure 14:
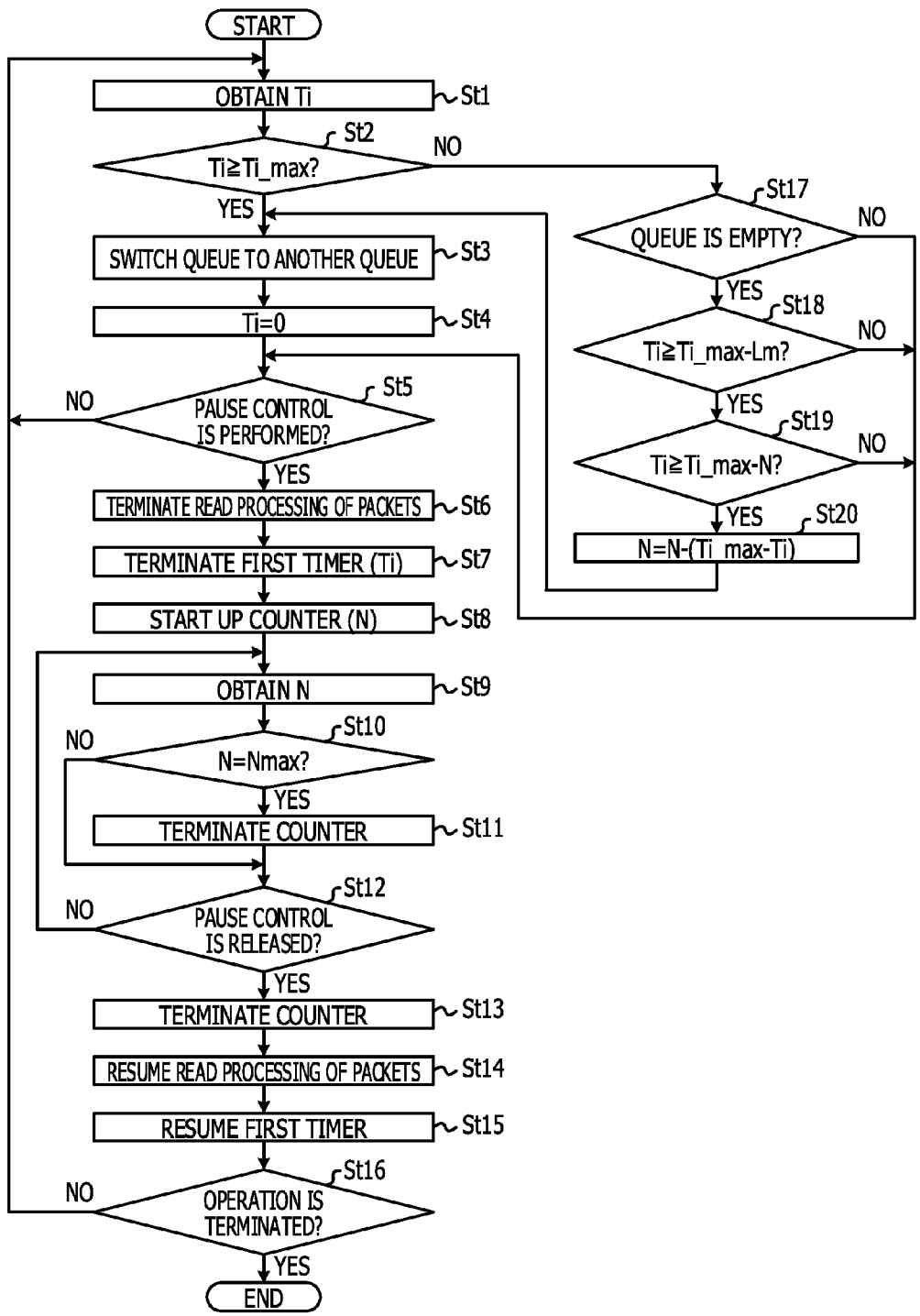
FIG. 14 is a flowchart illustrating an operation of a first selector.

FIG. 14 is a flowchart illustrating the operations of the first selectors 11 to 13. In FIG. 14, the times T1 to T10 that are indicated by the first timers 61 to 63 are referred to as "Ti" (i=1 to 10).

First, the first selectors 11 to 13 respectively obtain the times Ti from the first timers 61 to 63 (Step St1). The times Ti of the first timers 61 to 63 may not be the same.

After that, the first selectors 11 to 13 determine whether or not the time Ti is "Ti_max" or more (Step St2). Here, "Ti_max" is the maximum value of a selection time of each of the queues 30 to 54, and corresponds to the time width (10 (sec)) of the time period Tr. That is, the first selectors 11 to 13 determine whether or not the time period Tr of the queue of the queues 30 to 54, which has being selected, has elapsed.

When the time Ti is less than "Ti_max" (No in Step St2), the first selectors 11 to 13 execute processing of Step St17. As described later, in Steps St17 to St20, a time of read processing of an empty queue of the queues 30 to 54 is reduced.

When the time Ti is "Ti_max" or more (Yes in Step St2), the first selectors 11 to 13 respectively switch the queues from which packets P that are output from the output ports 851 to 853 are read, between the queue the queues 30 to 54 (Step St3). That is, the first selectors 11 to 13 switch the queues between the queues 30 to 54 each time the time period Tr elapses. After that, the first selectors 11 to 13 respectively reset, for example, the first timers 61 to 63 to satisfy "time Ti=0" (Step St4).

After that, the first selectors 11 to 13 determine the presence or absence of pause control (Step St5). The presence or absence of the pause control is determined, for example, based on the presence or absence of a termination instruction signal Sp. The determination processing of Step St5 may be executed prior to the determination processing of Step St3.

When the pause control is not performed (No in Step St5), the first selectors 11 to 13 execute the processing of Step St1 again. When the pause control is performed (Yes in Step St5), the first selectors 11 to 13 terminate the read processing of packets P from the queues from among queues 30 to 54, which have being selected (Step St6).

After that, the first selectors 11 to 13 respectively instruct the first timers 61 to 63 to terminate the count processing of the times Ti (Step St7). After that, the first selectors 11 to 13 respectively start up counters 11a to 13a (Step St8). As a result, the counters 11a to 13a start measurement of the termination times Tp.

After that, the first selectors 11 to 13 respectively obtain counter values N from the counters 11a to 13a (Step St9). After that, the first selectors 11 to 13 determine whether or not the counter value N is an upper limit value Nmax (Step St10).

When the counter value N is not the upper limit value Nmax (No in Step St10), the first selectors 11 to 13 execute processing of Step St12 that is described later. When the counter value N is the upper limit value Nmax (Yes in Step St10), the first selectors 11 to 13 respectively terminate the counters 11a to 13a (Step St11). As a result, the counters 11a to 13a terminate the measurement of the termination times Tp. In the example, it is assumed that the upper limit value Nmax is set to the first selectors 11 to 13, but may be set to the counters 11a to 13a. In this case, the counters 11a to 13a terminate the measurement of the termination times Tp autonomously.

After that, the first selectors 11 to 13 determine whether or not the pause control is released (Step St12). The determination of the presence or absence of release of the pause control is performed, for example, based on an instruction signal that indicates release of the pause control.

When the pause control is not released (No in Step St12), the first selectors 11 to 13 execute the processing of Step St9 again. When the pause control is released (Yes in Step St12), the first selectors 11 to 13 respectively terminate the counters 11a to 13a (Step St13). As a result, the counters 11a to 13a terminate the measurement of the termination times Tp. In Step St11, when the counters 11a to 13a are already terminated, the first selectors 11 to 13 may skip the processing of Step St13.

After that, the first selectors 11 to 13 resume the read processing of packets P that are output from the queues from among the queues 30 to 54, which have being selected (Step St14). After that, the first selectors 11 to 13 respectively resume the first timers 61 to 63 (Step St15). As a result, the first timers 61 to 63 resume the count of the times Ti.

After that, the first selectors 11 to 13 determine whether or not the operation is terminated due to a factor such as operation termination of the communication device (Step St16). The first selectors 11 to 13 end the processing when the operation is terminated (Yes in Step St16), and the first selectors 11 to 13 execute the processing of Step St1 again when the operation is continued (No in Step St16).

When the time Ti is less than "Ti_max" (No in Step St2), the first selectors 11 to 13 determine whether or not the queue from among the queues 30 to 54, which has being selected, is empty (Step St17). The determination processing of Step St17 is executed, for example, based on management information of the queues 30 to 54, which is obtained from the queue management unit 82 or a free space value that is obtained from the queues 30 to 54. When the queue from among the queues 30 to 54, which has being selected, is not empty (No in Step St17), the first selectors 11 to 13 execute the processing of Step St5.

When the queue from among the queues 30 to 54, which has being selected, is empty (Yes in Step St17), the first selectors 11 to 13 determine whether or not the time Ti is a value or more, which is obtained by subtracting an upper limit value Lm of a time to be reduced for each of the queues 30 to 54 from the time width Ti_max (Step St18).

As a result, when the time of the read processing of the queue from among the queues 30 to 54, which have being selected, is reduced, the first selectors 11 to 13 determine whether or not the time to be reduced is the upper limit value Lm or less. In the example of FIG. 13, the upper limit value Lm is two seconds, so that the first selectors 11 to 13 determine whether or not the time Ti is eight seconds (time width 10 (sec)−upper limit value 2 (sec)) or more.

When the time Ti is less than the value that is obtained by subtracting the upper limit value Lm from the time width Ti_max (No in Step St18), the first selectors 11 to 13 execute the processing of Step St5. When the time Ti is the value or more, which is obtained by subtracting the upper limit value Lm from the time width Ti_max (Yes in Step St18), the first selectors 11 to 13 determine whether or not the time Ti is a value or more, which is obtained by subtracting a counter value N from the time width Ti_max (Step St19).

As a result, when the time of the read processing of the queue from among the queues 30 to 54, which has being selected, is reduced, the first selectors 11 to 13 determine whether or not the time to be reduced is the counter value N or less. In the example of FIG. 11, the counter value N at the time t2 is five seconds, so that the first selectors 11 to 13 determine whether or not the time Ti is five seconds (time width 10 (sec)−counter value 5 (sec)) or more when the queue 31 is being selected.

When the time Ti is less than the value that is obtained by subtracting the counter value N from the time width Ti_max (No in Step St19), the first selectors 11 to 13 execute the processing of Step St5. When the time Ti is the value or more, which is obtained by subtracting the counter value N from the time width Ti_max (Yes in Step St19), the first selectors 11 to 13 update the counter values N to "N−(Ti_max−Ti)" (Step St20). That is, the first selectors 11 to 13 subtract the times to be reduced (Ti_max−Ti) from the counter values N.

After that, the first selectors 11 to 13 execute the processing of Step St3 again. That is, the first selectors 11 to 13 skip the read processing of the empty queues from among the queues 30 to 54, and switch the queues to queues of the next time periods Tr. The operations of the first selectors 11 to 13 are performed as described above.

Figure 15:
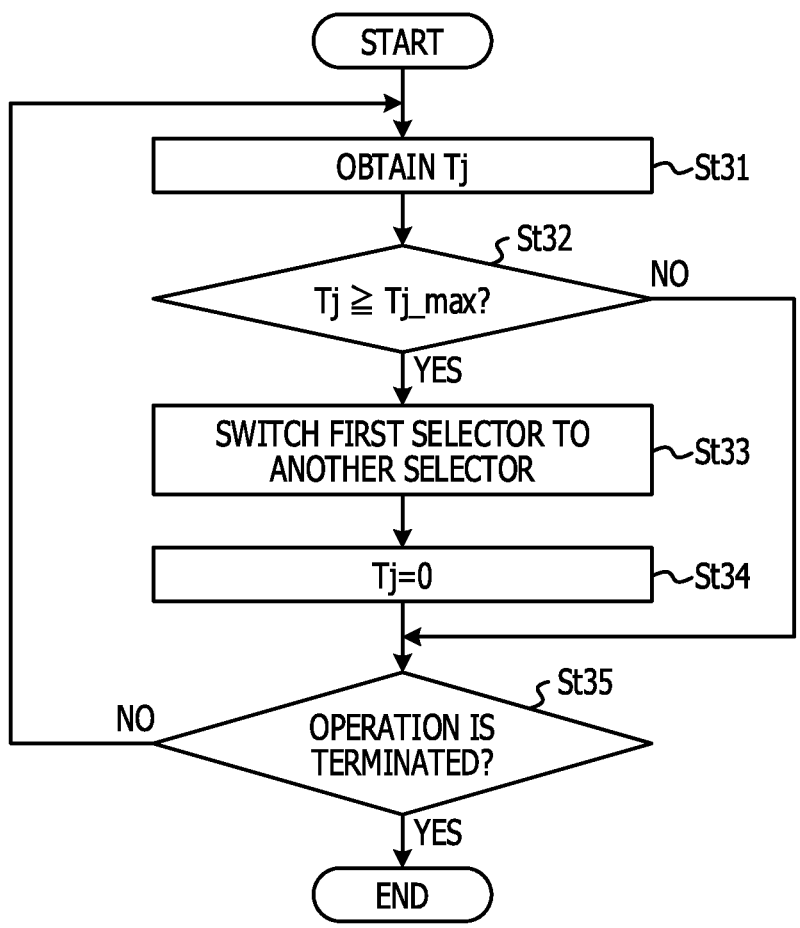
FIG. 15 is a flowchart illustrating an operation of a second selector.

FIG. 15 is a flowchart illustrating an operation of the second selector 2. First, the second selector 2 obtains a time Tj from the second timer 7 (Step St31).

After that, the second selector 2 determines whether or not the time Tj is "Tj_max" or more (Step St32). Here, "Tj_max" is a time interval that is determined based on the output rates of the output ports 851 to 853 (10 (packets/sec)), and is 0.2 seconds in the example of FIG. 9.

When the time Tj is less than "Tj_max" (No in Step St32), the second selector 2 executes processing of Step St35 that is described later. When the time Tj is "Tj_max" or more (Yes in Step St32), the second selector 2 switches the first selector from which packets are output, between the first selectors 11 to 13 (Step St33). As a result, the first selector is switched between the first selectors 11 to 13 at time intervals of 0.2 (sec). After that, the second selector 2 sets "time Tj=0" for example, by resetting the second timer 7 (Step St34).

After that, the second selector 2 determines whether or not the operation is terminated due to a factor such as operation termination of the communication device (Step St35). The second selector 2 ends the processing when the operation is terminated (Yes in Step St35), and executes the processing of Step St31 again when the operation is continued (No in Step St35). The operation of the second selector 2 is performed as described above.

As described above, the communication device according to the embodiments includes the plurality of output ports 851 to 853, the plurality of queues 30 to 54, the plurality of first selectors 11 to 13, and the second selector 2. In the plurality of queues 30 to 54, packets P are stored so as to be sorted into groups of packets that are output from the same output port from among the plurality of output ports 851 to 853 in the same time period Tr.

The plurality of first selectors 11 to 13 respectively correspond to the plurality of output ports 851 to 853, and switch queues from which packets P that are to be output from the output port are read, between the plurality of queues 30 to 54 each time the time period Tr elapses. The second selector 2 switches a first selector from which packets P are output, between the plurality of first selectors 11 to 13, at time intervals in accordance with the output rates of packets P of the plurality of output ports 851 to 853.

In the plurality of queues 30, 31, . . . , and 34, queues 40, 41, . . . , and 44, . . . , and queues 50, 51, . . . , and 54, packets P are stored so as to be sorted into groups of packets that are output from the same output port from among the plurality of output ports 851 to 853. The first selectors 11 to 13 switch the queues from which packets are output, between the queues 30 to 54 for the output ports 851 to 853, respectively.

Thus, even when the read termination control (pause control) is performed, a first selector that is a control target from among the plurality of first selectors 11 to 13 merely terminates read processing of packets P, so that impact on packets P that are output from the other output ports is avoided.

In addition, the first selectors 11 to 13 respectively switch the queues from which packets P that are output from the output ports 851 to 853 are read, between the queues 30 to 54 each time the time period Tr elapses. The second selector 2 switches the first selector from which packets P are output, between the first selectors 11 to 13, at time intervals in accordance with the output rates of packets P of the plurality of output ports 851 to 853.

Therefore, the second selector 2 may adjust an amount of packets that are output from the first selectors 11 to 13 in a unit time, based on the output rates of the output ports 851 to 853. Thus, in the embodiment, it is avoided that packets P which exceed the output rate of each of the output ports 851 to 853 are input to the corresponding output port from among the output ports 851 to 853, so that the low burstiness is achieved. Therefore, frequent occurrence of the read termination control and packet loss are suppressed, so that the communication quality is improved.

In addition, the time interval at which the first selector is switched between the first selectors 11 to 13 is determined regardless of the lengths of the time periods Tr of the queues 30 to 54, that is, the time widths. Therefore, the time widths are extended by increasing the capacities of the queues 30 to 54, so that the scale of the hardware may be reduced.

In addition, a communication method according to the embodiments includes the following Steps.

Step (1): storing packets P in the plurality of queues 30 to 54 so as to sort the packets into groups of packets that are output from the same output port in the same time period Tr, from among the plurality of output ports 851 to 853

Step (2): switching a queue from which packets P that are output from the output port are read, between the plurality of queues 30 to 54 by each of a plurality of first selectors 11 to 13 that respectively correspond to the plurality of output ports 851 to 853 each time the time period elapses Step (3): switching a first selector from which packets P are output, between the plurality of first selectors 11 to 13, at time intervals in accordance with output rates of packets P of the plurality of output ports 850 to 853, by the second selector 2.

The communication method according to the embodiments has a similar configuration to that of the above-described communication device according to the embodiments, so that an operation effect that is similar to that the above-described contents is obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
    a plurality of output ports;
    a plurality of queues in which packets are stored so as to be sorted into groups of packets that are output from an identical output port, from among the plurality of output ports, in an identical time period from among a plurality of time periods;
    a plurality of first selectors that respectively corresponds to the plurality of output ports, each of the plurality of first selectors switching a queue from which packets to be output are read, between the plurality of queues at time intervals corresponding to the plurality of time periods;
    a second selector that switches a first selector from which packets are output, between the plurality of first selectors, at time intervals in accordance with output rates of the packets via the plurality of output ports; and
    a counter that measures a termination time in which each of the plurality of first selectors terminates read processing by a termination control, and that notifies the plurality of first selectors of the measured termination time;
    wherein each of the plurality of first selectors terminates read processing of the packets in accordance with the termination control of a corresponding output port from among the plurality of output ports.

2. The communication device according to claim 1, wherein each of the plurality of first selectors reduces selection times of one or more empty queues from among the plurality of queues, by the termination time at most after the termination control is released.

3. The communication device according to claim 2, wherein a total of times to be reduced from the selection times of the one or more empty queues is limited to a first upper limit value that is smaller than the termination time.

4. The communication device according to claim 2, wherein each time to be reduced from the selection times of the one or more empty queues is limited to a second upper limit value that is smaller than the time period.

5. A communication method comprising:
    storing packets in a plurality of queues so as to sort the packets into groups of packets that are output from an identical output port, from among a plurality of output ports, in an identical time period from among a plurality of time periods;
    switching a queue from which packets to be output are read, between the plurality of queues at time intervals corresponding to the plurality of time periods, by each of a plurality of first selectors that respectively correspond to the plurality of output ports;

switching, by a second selector, a first selector from which packets are output, between the plurality of first selectors, at time intervals in accordance with output rates of the packets via the plurality of output ports;

measuring a termination time in which each of the plurality of first selectors terminates read processing by a termination control; and notifying the plurality of first selectors of the measured termination time;

wherein each of the plurality of first selectors terminates read processing of the packets in accordance with the termination control of a corresponding output port from among the plurality of output ports.

6. The communication method according to claim 5, wherein each of the plurality of first selectors reduces selection times of one or more empty queues from among the plurality of queues, by the termination time at most after the termination control is released.

7. The communication method according to claim 6, wherein a total of times to be reduced from the selection times of the one or more empty queues is limited to a first upper limit value that is smaller than the termination time.

8. The communication method according to claim 6, wherein each time to be reduced from the selection times of the one or more empty queues is limited to a second upper limit value that is smaller than the time period.

* * * * *